US012556595B2

(12) United States Patent
Hodgins et al.

(10) Patent No.: US 12,556,595 B2
(45) Date of Patent: Feb. 17, 2026

(54) SYSTEMS AND METHODS FOR MANAGING DISTRIBUTED CLIENT DEVICE MEMBERSHIP WITHIN GROUP-BASED COMMUNICATION CHANNELS

(71) Applicant: Salesforce, Inc., San Francisco, CA (US)

(72) Inventors: Matthew Hodgins, Toronto (CA); Michael Montazeri, Brooklyn, NY (US); Kyle Stetz, Philadelphia, PA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/387,005

(22) Filed: Nov. 3, 2023

(65) Prior Publication Data
US 2024/0073262 A1    Feb. 29, 2024

Related U.S. Application Data

(63) Continuation of application No. 17/819,877, filed on Aug. 15, 2022, now Pat. No. 11,843,646, which is a
(Continued)

(51) Int. Cl.
*G06F 16/2457* (2019.01)
*G06N 20/00* (2019.01)
(Continued)

(52) U.S. Cl.
CPC ........ *H04L 65/403* (2013.01); *G06F 16/2457* (2019.01); *G06F 16/24578* (2019.01); *G06N 20/00* (2019.01); *H04L 67/10* (2013.01)

(58) Field of Classification Search
CPC ... H04L 65/403; H04L 67/10; H04L 67/1097; H04L 67/306; G06F 16/2457; G06F 16/24578; G06N 20/00; G06N 7/023
(Continued)

(56) References Cited

U.S. PATENT DOCUMENTS 7,426,540 B1    9/2008 Matsumoto et al.
7,644,144 B1    1/2010 Horvitz et al.
(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.
(Continued)

*Primary Examiner* — Cam Y T Truong
(74) *Attorney, Agent, or Firm* — Lee & Hayes, P.C.

(57) ABSTRACT

Systems and methods initialize distributed client device membership for new client devices joining a group-based communication channel established for content exchange among a plurality of distributed client device members. The systems and methods comprise aspects for executing a content analysis over the content of the one or more group-based communication channels to identify characterizing terms associated with each group-based communication channel. After the content analysis is performed, systems receive search parameters from a potential new member client device for a group-based communication server. Various systems and methods provide selected search results generated based at least in part on a determination that characterizing terms match one or more of the search parameters to the client device. Those selected results comprise a target that is executable by the client device to join the associated group-based communication channel.

20 Claims, 9 Drawing Sheets

Related U.S. Application Data continuation of application No. 15/963,724, filed on Apr. 26, 2018, now Pat. No. 11,431,769.

(51) Int. Cl.
   *H04L 65/403* (2022.01)
   *H04L 67/10* (2022.01)

(58) Field of Classification Search
   USPC ......................................................... 707/728
   See application file for complete search history.

(56) References Cited

U.S. PATENT DOCUMENTS

| | | | |
|---|---|---|---|
| 8,874,558 B1 | 10/2014 | He et al. | |
| 9,160,550 B1 | 10/2015 | Morrison et al. | |
| 9,589,032 B1 | 3/2017 | Brinck et al. | |
| 2004/0243582 A1* | 12/2004 | Sasaki ................... | G06Q 10/10 707/999.009 |
| 2007/0261102 A1 | 11/2007 | Spataro et al. | |
| 2007/0288602 A1 | 12/2007 | Sundaresan | |
| 2008/0275691 A1* | 11/2008 | Summerlin ............ | G06F 40/40 707/E17.073 |
| 2009/0089261 A1 | 4/2009 | Leher et al. | |
| 2009/0198675 A1 | 8/2009 | Mihalik et al. | |
| 2010/0030734 A1 | 2/2010 | Chunilal | |
| 2011/0282888 A1 | 11/2011 | Koperski et al. | |
| 2012/0030215 A1 | 2/2012 | Herron et al. | |
| 2012/0084312 A1 | 4/2012 | Jenson | |
| 2012/0101985 A1 | 4/2012 | Kemp et al. | |
| 2012/0109966 A1 | 5/2012 | Liang et al. | |
| 2012/0124071 A1 | 5/2012 | Gebhard et al. | |
| 2012/0191861 A1* | 7/2012 | Bennett ................. | G06Q 10/10 709/227 |
| 2012/0192082 A1 | 7/2012 | Bakalov et al. | |
| 2012/0209871 A1 | 8/2012 | Lai et al. | |
| 2012/0246153 A1 | 9/2012 | Pehle | |
| 2014/0288913 A1 | 9/2014 | Shen et al. | |
| 2014/0304249 A1 | 10/2014 | Ayzenshtat et al. | |
| 2015/0142888 A1 | 5/2015 | Browning et al. | |
| 2015/0207831 A1* | 7/2015 | Gaspari ................. | H04L 67/75 709/205 |
| 2016/0065520 A1 | 3/2016 | Puranik et al. | |
| 2016/0253410 A1 | 9/2016 | Gandert et al. | |
| 2016/0323619 A1 | 11/2016 | Lewis et al. | |
| 2016/0337307 A1* | 11/2016 | Ahrens ................. | G06F 16/285 |
| 2017/0061016 A1 | 3/2017 | Lytkin et al. | |
| 2017/0142489 A1* | 5/2017 | DeWeese ........... | H04N 21/4622 |
| 2017/0149795 A1* | 5/2017 | Day, II ................. | H04L 63/108 |
| 2017/0201504 A1* | 7/2017 | Funk ................... | H04L 63/0471 |
| 2017/0201575 A1 | 7/2017 | Song et al. | |
| 2017/0220652 A1 | 8/2017 | Kazi et al. | |
| 2017/0250989 A1 | 8/2017 | Bhattacharya et al. | |
| 2017/0301041 A1* | 10/2017 | Schneider ............. | G06Q 50/01 |
| 2017/0331828 A1 | 11/2017 | Caldera et al. | |
| 2018/0060915 A1 | 3/2018 | Liu et al. | |
| 2018/0232421 A1 | 8/2018 | Dialani et al. | |
| 2018/0287982 A1 | 10/2018 | Draeger et al. | |
| 2018/0337795 A1 | 11/2018 | Katrak et al. | |
| 2019/0114347 A1 | 4/2019 | Johansen et al. | |
| 2019/0130037 A1 | 5/2019 | Guo et al. | |
| 2019/0197487 A1 | 6/2019 | Jersin et al. | |
| 2019/0236718 A1 | 8/2019 | Rastkar et al. | |
| 2022/0394066 A1 | 12/2022 | Hodgins | |
| 2023/0078155 A1 | 3/2023 | Sharp et al. | |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat> (dated May 28, 2019) 21 pages.

Mike Issac, "Slack, a Start-Up With an App to Foster Business Collaboration, Is Valued at $1.1 Billion", The New York Times Blogs (BTIS), Lexisnexis, https://advance.lexis.com/api/permalink/3eb84b34-a8f9-4d7d-9573-89d9598a4963/?context=1000516> (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Office Action for U.S. Appl. No. 17/819,877, mailed on Apr. 25, 2023, Hodgins, "Systems and Methods for Managing Distributed Client Device Membership Within Group-Based Communication Channels", 8 pages.

Office Action for U.S. Appl. No. 15/963,724, mailed on May 11, 2020, Hodgins, "Systems and Methods for Managing Distributed Client Device Membership Within Group-Based Communication Channels", 9 pages.

Office Action for U.S. Appl. No. 15/963,724, mailed on Jun. 29, 2021, Hodgins, "Systems and Methods for Managing Distributed Client Device Membership Within Group-Based Communication Channels", 10 pages.

Office Action for U.S. Appl. No. 15/963,724, mailed on Oct. 21, 2021, Hodgins, "Ystems and Methods for Managing Distributed Client Device Membership Within Group-Based Communication Channels", 12 pages.

Office Action for U.S. Appl. No. 15/963,724, mailed on Oct. 23, 2020, Hodgins, "Systems and Methods for Managing Distributed Client Device Membership Within Group-Based Communication Channels", 10 pages.

Dikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up The Slack", TEDIUM, [online][retrieved May 9, 2019]. Retrieved from the Internet: <URL: https://tedium.co/2017/10/17/irc-vs-slack-chat-history/> (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, at FP10, Lexisnexis, https://advance.lexis.com/api/

(56) References Cited

OTHER PUBLICATIONS permalink/96268e3f-26ad-48ac-a98f-6c39804ebded/?context=1000516, (dated Mar. 4, 2014) 3 pages.

* cited by examiner

Group X

*#advertising*
- Lorem ipsum [pop-up]
- Dolor sit ament [pop-up], [debitis]
- Mandamus quaerendum

*#business*
- Ex vis, eum omittam [ARR]
- Tincidunt [ARR] ea. An has mucius
- Doctus recteque, fuisset

*#cs-expansion-emec*
- Legendos no quo.
- Id ius [ARR] ignota
- lisque molestie [ARR]

. . .

*#Personnel*
- . . .
- . . .
- . . .

Group Z

*#Hiking*
- Lorem ipsum [mountain]
- Dolor sit ament, debitis pop-up
- Mandamus quaerendum

*#factory-expansion*
- Ex vis, eum omittam [mountain] [silos]
- Tincidunt ea. An has mucius
- Doctus recteque, fuisset

*#global-expansion*
- Legendos no quo.
- Id ius ignota
- lisque molestie [domination]

. . .

*#interstellar-expansion*
- . . .
- . . .
- . . .

Start exploring...

Find channels to join by entering relevant keywords or phrases.

Some examples:
- "design"
- "SLI"
- "search"

| Search Parameter: | *ARR* |
|---|---|
| Ranked results | Score |
| 1 | #biz-dash-metrics-arc | 98 |
| | *"ARR" appears 86 times* | |
| 2 | #cs-expansion-emea | 81 |
| | *"ARR" appears 71 times* | |
| 3 | #business | 72 |
| | *"ARR" appears 62 times* | |
| 4 | #leadership | 61 |
| | *"ARR" appears 57 times* | |
| 5 | #c-suite | 44 |
| | *"ARR" appears 51 times* | |
| 6 | #hiring | 40 |
| | *"ARR" appears 51 times* | |
| 7 | #internals | 11 |
| | *"ARR" appears 8 times* | |

FIG. 7

SYSTEMS AND METHODS FOR MANAGING DISTRIBUTED CLIENT DEVICE MEMBERSHIP WITHIN GROUP-BASED COMMUNICATION CHANNELS

RELATED APPLICATIONS

This Application is a continuation of, and claims priority to U.S. patent application Ser. No. 17/819,877, filed Aug. 15, 2022, which is a continuation of U.S. patent application Ser. No. 15/963,724, filed Apr. 26, 2018, and issued as U.S. Pat. No. 11,431,769, on Aug. 30, 2022, each of which is incorporated herein by reference.

BACKGROUND

Group-based communication platforms accessible to a plurality of users via respective client devices may enable users to communicate with one another through discrete group-based communication channels. Each of these group-based communication channels may be individually accessible by a plurality of distributed client devices (e.g., each associated with a particular user), however joining any of these group-based communication channels requires a client device to have identifying data targeting a particular group-based communication channel to join before the group-based communication platform can establish a data exchange-enabling communication connection with other members of the particular group-based communication platform.

Historically, the identifying data targeting a particular group-based communication channel has been a title or other defined identifier of the particular group-based communication channel to be joined. However, titles may not be entirely reflective of the data exchanged between members of group-based communication channels, and therefore potential new members of various group-based communication channels may be hindered in locating potentially relevant group-based communication channels to join.

Thus, a need exists for mechanisms for providing group-based communication channel identifying data that enables client devices to obtain access to various group-based communication channels. Through applied effort, ingenuity, and innovation, many of these identified deficiencies and problems have been solved by developing solutions that are in accordance with the embodiments of the present invention, many examples of which are described in detail herein.

BRIEF SUMMARY

Generally, embodiments described herein utilize machine-learning content analysis techniques to identify potentially relevant topics, descriptors, content, and/or the like of various group-based communication channels within a group-based communication platform. The results of the machine learning utilized in certain embodiments provides one or more alternative targets linking to the group-based communication channel that potential new member client-devices may utilize to initialize entry into the group-based communication channel to begin content exchange with other members of the group-based communication channel.

Various embodiments are directed to a computer-implemented method for initializing distributed client device membership with one of a plurality of group-based communication channels established for content exchange among a plurality of distributed client device members and accessible via a group-based communication platform, the method comprising: executing a term frequency-inverse document frequency (Tf-idf) analysis of content exchanged within each of the plurality of group-based communication channels to identify one or more characterizing terms associated with each group-based communication channel; transmitting selected results of the Tf-idf analysis to a first client device, wherein the selected results comprise one or more targets each identifying a group-based communication channel of the plurality of group-based communication channels associated with one or more characterizing terms matching one or more search parameters received from the first client device; and initializing membership of the first client device with one of the group-based communication channels identified within the selected results to enable content exchange by the first client device with additional client device members of the group-based communication channel.

In certain embodiments, the selected results are transmitted as a ranked set sorted based on degrees of match with the one or more search parameters. Moreover, the method may further comprise identifying a participant group of each of the group-based communication channels identified within the selected results; identifying one or more auxiliary results identifying one or more additional group-based communication channels having a participant group matching one or more participant groups of the group-based communication channels identified within the selected results; and transmitting the one or more auxiliary results to the client device. Moreover, identifying one or more auxiliary results may comprise utilizing fuzzy logic to identify the one or more additional group-based communication channels having a participant group matching one or more participant groups of the group-based communication channels identified within the selected results. In certain embodiments, the search parameters are generated based at least in part on user input received at the client device. Moreover, the search parameters may be generated at the client device based on local data files transmitted to the client device. The selected results of various embodiments identify one or more group-based communication channels satisfying one or more activity criteria.

Moreover, in various embodiments the selected results identify one or more group-based communication channels previously visited by the client device. In certain embodiments, each of the plurality of group-based communication channels comprise identifying metadata, and wherein the method may further comprise steps for: identifying one or more group-based communication channels comprising identifying metadata matching one or more of the search parameters; and transmitting topic results identifying the one or more group-based communication channels comprising identifying metadata matching one or more of the search parameters to the client device. Moreover, the identifying metadata may comprise a title for each group-based communication channel.

Certain embodiments are directed to an apparatus for initializing distributed client device membership with one of a plurality of group-based communication channels established for content exchange among a plurality of distributed client device members and accessible via a group-based communication platform. In certain embodiments, the apparatus comprises one or more non-transitory memory storage areas; and one or more processors. The one or more processors may be collectively configured to: execute a term frequency-inverse document frequency (Tf-idf) analysis of content exchanged within each of the plurality of group-based communication channels to identify one or more characterizing terms associated with each group-based communication channel; transmit selected results of the Tf-idf analysis to a first client device, wherein the selected results identify one or more group-based communication channels of the plurality of group-based communication channels associated with one or more characterizing terms matching one or more search parameters received from the first client device; and initialize membership of the first client device with one of the group-based communication channels identified within the selected results to enable content exchange by the first client device with additional client device members of the group-based communication channel.

In various embodiments, the selected results are transmitted as a ranked set sorted based on degrees of match with the one or more search parameters. Moreover, the one or more processors may be further configured to: identify a participant group of each of the group-based communication channels identified within the selected results; identify one or more auxiliary results identifying one or more additional group-based communication channels having a participant group matching one or more participant groups of the group-based communication channels identified within the selected results; and transmit the one or more auxiliary results to the client device.

In certain embodiments, identifying one or more auxiliary results comprises utilizing fuzzy logic to identify the one or more additional group-based communication channels having a participant group matching one or more participant groups of the group-based communication channels identified within the selected results. The search parameters may be further generated based at least in part on user input received at the client device. Moreover, the search parameters may be generated at the client device based on local data files transmitted to the client device. In various embodiments, the selected results identify one or more group-based communication channels satisfying one or more activity criteria. Moreover, the selected results may identify one or more group-based communication channels previously visited by the client device. In certain embodiments, each of the plurality of group-based communication channels comprise identifying metadata, and the one or more processors may be further configured to: identify one or more group-based communication channels comprising identifying metadata matching one or more of the search parameters; and transmit topic results identifying the one or more group-based communication channels comprising identifying metadata matching one or more of the search parameters to the client device. In certain embodiments, the identifying metadata comprises a title for each group-based communication channel.

Certain embodiments are directed to a computer-program product for initializing distributed client device membership with one of a plurality of group-based communication channels established for content exchange among a plurality of distributed client device members and accessible via a group-based communication platform. In certain embodiments, the computer program product comprising at least one non-transitory computer-readable storage medium having computer-readable program code portions stored therein, the computer-readable program code portions comprising an executable portion configured to: execute a term frequency-inverse document frequency (Tf-idf) analysis of content exchanged within each of the plurality of group-based communication channels to identify one or more characterizing terms associated with each group-based communication channel; transmit selected results of the Tf-idf analysis to a first client device, wherein the selected results identify one or more group-based communication channels of the plurality of group-based communication channels associated with one or more characterizing terms matching one or more search parameters received from the first client device; and initialize membership of the first client device with one of the group-based communication channels identified within the selected results to enable content exchange by the first client device with additional client device members of the group-based communication channel.

In certain embodiments, the selected results are transmitted as a ranked set sorted based on degrees of match with the one or more search parameters. Moreover, the executable portion may be further configured to: identify a participant group of each of the group-based communication channels identified within the selected results; identify one or more auxiliary results identifying one or more additional group-based communication channels having a participant group matching one or more participant groups of the group-based communication channels identified within the selected results; and transmit the one or more auxiliary results to the client device. In various embodiments, identifying one or more auxiliary results comprises utilizing fuzzy logic to identify the one or more additional group-based communication channels having a participant group matching one or more participant groups of the group-based communication channels identified within the selected results. Moreover, the search parameters may be generated based at least in part on user input received at the client device. In various embodiments, the search parameters are generated at the client device based on local data files transmitted to the client device. Moreover, the selected results may identify one or more group-based communication channels satisfying one or more activity criteria. Moreover, the selected results may identify one or more group-based communication channels previously visited by the client device. In various embodiments, each of the plurality of group-based communication channels comprise identifying metadata, and the executable portion may be further configured to: identify one or more group-based communication channels comprising identifying metadata matching one or more of the search parameters; and transmit topic results identifying the one or more group-based communication channels comprising identifying metadata matching one or more of the search parameters to the client device. In certain embodiments, the identifying metadata comprises a title for each group-based communication channel.

BRIEF DESCRIPTION OF THE SEVERAL VIEWS OF THE DRAWINGS

Reference will now be made to the accompanying drawings, which are not necessarily drawn to scale, and wherein:

FIG. 4 shows example data that may be sorted and/or searched according to one embodiment;

FIG. 7 shows example unfiltered data utilized to generate the example results interface of FIG. 6;

DETAILED DESCRIPTION

Figure 1:
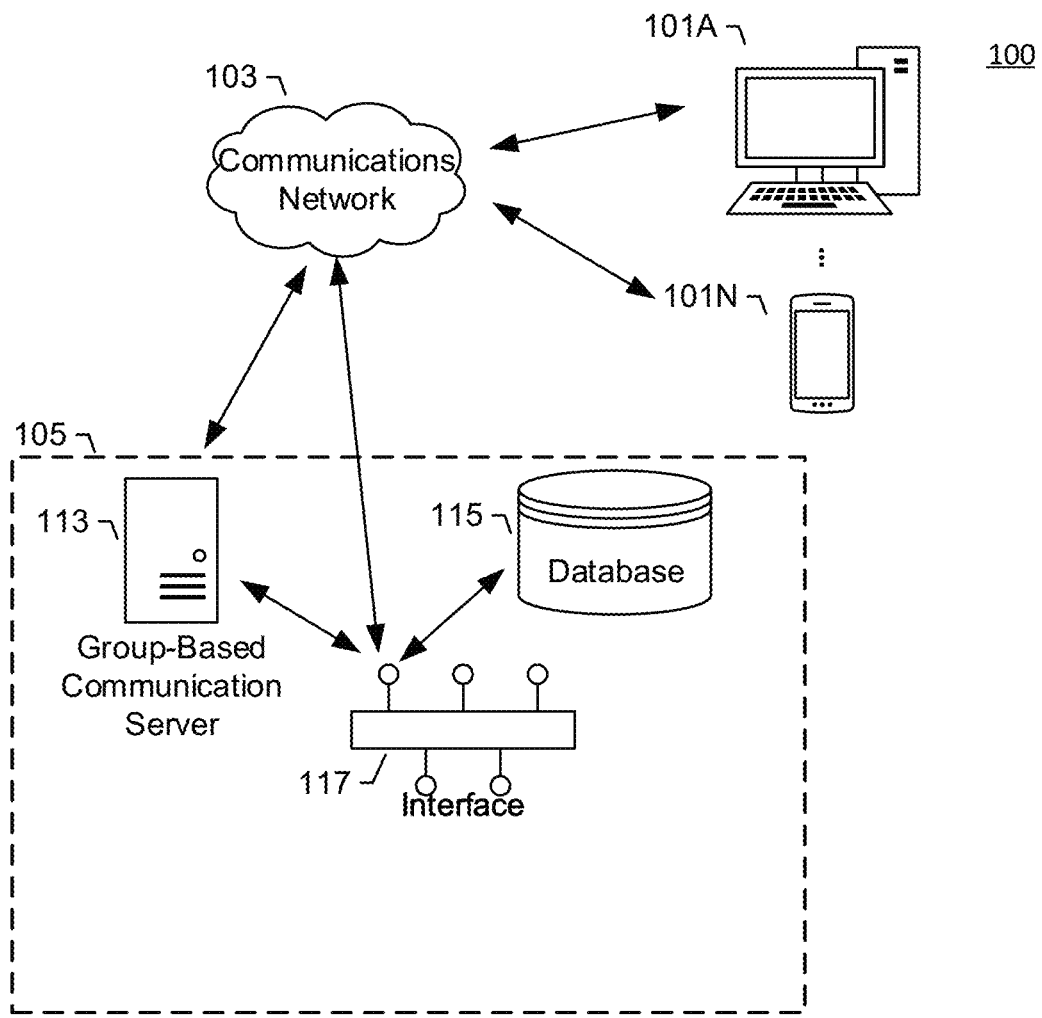
FIG. 1 shows an example configuration of a plurality of network connected computing systems interacting according to a group-based communication platform according to one embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

Various embodiments are directed to systems and methods for managing communication-enabling connections between a plurality of distributed client devices via group-based communication channels accessible through a group-based communication platform. Each group-based communication channel enables content exchange between client device members of the respective group-based communication channel. The management systems and methods are configured for initializing membership of new client-device members within one or more group-based communication channels to enable content exchange among a plurality of distributed client device members (including the newly initialized client-device member) within the group-based communication channel accessible via a group-based communication platform.

To initialize a new client device member of a group-based communication channel, the potential new client device provides target data (e.g., including a request message comprising one or more group-based communication channel identifiers identifying the group-based communication channel requested to be joined by the client device) to a centralized group-based communication platform interface (e.g., comprising a plurality of servers and/or databases accessible by a plurality of client-devices via one or more external-facing interface mechanisms), which directs the potential new client device to the targeted group-based communication channel (e.g., embodied as a JSON content exchange interface).

The described systems and methods for managing membership within the plurality of group-based communication channels are configured for providing optionally selectable target data identifying one or more group-based communication channels to various client devices based at least in part on the content exchanged within the one or more group-based communication channels. The client devices may thus select one or more of the optionally selectable target data to request entry into the respective group-based communication channel. The optionally selectable target data may be generated in part based on searches performed locally at the client device (e.g., searches for frequently visited channels matching provided search parameters) and/or may be generated in part based on searches performed at a group-based communication server.

Searches performed at a group-based communication server may rely on the results of an analysis of content exchanged within the one or more group-based communication channels via one or more machine-learning algorithms, such as Term-frequency-inverse document frequency (Tf-idf) algorithms, clustering algorithms, predictive models, trending algorithms (e.g., K-L divergence), and/or the like, to identify relevant terms that may characterize each of the plurality of group-based communication channels. A client device may thereafter provide search parameters to the centralized group-based communication platform, which returns optionally selectable target data to group-based communication channels having associated characterizing terms matching the search parameters provided by the client device.

Thus, various systems and methods provide optionally-selectable target data to client devices that may be utilized to gain access to group-based communication channels characterized by content exchanged therein being relevant to search parameters provided by the client device. Client devices need not unilaterally provide channel-identifying target data to gain access to a particular group-based communication channel (e.g., by providing the title of a particular group-based communication channel).

Definitions

As used herein, the terms "data," "content," "information," and similar terms may be used interchangeably to refer to data capable of being transmitted, received, exchanged (e.g., transmitted and received between a plurality of computing entities), and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "user" should be understood to refer to an individual, a group of individuals, business, organization, and the like. Users may access a group-based communication or messaging system using client devices. The users may be located in geographically distributed locations (e.g., in different countries, in different cities, in different neighborhoods, in different buildings, in different rooms, in different portions of a room, and/or the like), and the respective client devices may thus be distributed among different locations. "Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The terms "user profile," "user account," and "user account details" refer to information associated with a user, including, for example, a user identifier, one or more group-based communication channel identifiers associated with group-based communication channels that the user is a member of, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, and the like. The user account details can include a subset designation of user credentials, such as, for example, login information for the user including the user's username and password.

The term "client device" refers to computer hardware(s) and/or software(s) that is/are configured to access one or more services made available by one or more servers. The server(s) is/are often (but not always) on another computer system, in which case the client device accesses the service by way of a network. A client device may be associated with a group identification, where the group identification is an electronic indication that suggests a group (e.g., user group) that the user belongs to. Client devices may include, without limitation, smart phones, tablet computers, laptop computers, desktop computers, wearable devices, personal computers, enterprise computers, and the like.

The term "group-based communication platform" refers to a collection of computing services that are accessible to one or more client devices, and that are operable to provide access to a plurality of software applications related to operations of databases. In some examples, the group-based communication platform may be provided by one or more central servers (e.g., group-based communication servers) disposed in communication with one or more additional servers running software applications, and having access to one or more databases storing digital content items, application-related data, and/or the like. The group-based communication platform may also support client retention settings and other compliance aspects. Further, the group-based communication platform may provide comprehensive third party developer support that grants appropriate access to the data and allows third parties to build applications and bots to integrate with customer's workflows.

The term "communication channel" refers to an information route and associated circuitry that is used for data exchange between and among systems and parts of systems. For example, a communication channel may be established between and among various client devices, allowing these client devices to communicate and share data between and among each other. These communication channels may be "group-based communication channels" established between and among a select group of client devices (and their respective users) for sharing messages among all users of the group. Membership to a particular group-based communication channel may be restricted to members of the particular group within which the particular communication channel is associated. Consequently, users within a first group (e.g., accessing the group-based communication platform via respective client devices) are unable to search for, join, or otherwise participate in communication channels associated with a second group. However, users may be members of multiple groups, and in such instances individual users may have access to communication channels associated with each of the multiple groups by selectively switching between group-based communication channel interfaces associated with each of the groups.

Multiple communication channels may operate on each of one or more computing devices, and therefore a communication channel identifier may be assigned to a communication channel, which indicates the physical address in a database where related data of that communication channel is stored and which is utilized to identify client device membership (e.g., a participant group comprising a plurality of client devices that participate within the communication channel as members to receive data exchanged on the communication channel). The communication channel identifier therefore ensures communication channels remain distinct and separate even on computing devices associated with a plurality of communication channels. The communication channel identifier may be a part of, and/or referenced by a "target" or "target data" utilized by one or more client devices used to gain access to the respective group-based communication channel. For example, the target data may be embodied as a request message transmitted by a client device to request access to the particular group-based communication channel to become initialized as a member of the group-based communication channel. The request may be automatically granted in certain embodiments, or the request may require approval from a user having administrative access to the group and/or channel.

A communication channel may be "public," which may allow any client device to become a member of the communication channel and participate in the information sharing through the communication channel. Public communication channels may be searchable, such that public communication channels may appear in client device search results (e.g., searching for a particular communication channel). Membership in public communication channels may remain subject to approval of a membership request however, as mentioned above. In such embodiments, users are unable to view the content exchanged within a public communication channel until the membership request has been approved and the user becomes a member of the public communication channel. However, although users are unable to view the content exchanged within public communication channels for which the user is not a member, the content exchanged within these public communication channels is considered (e.g., according to various algorithms) when hierarchically ranking communication channels for display in search results according to certain embodiments.

A communication channel may be "private," which may restrict data communications in the communication channel to certain client devices and/or users. Accordingly, the term "private group-based communication channel" refers to a group-based communication channel with restricted access such that it is not generally accessible and/or searchable by other members of the group-based communication system. Because private communication channels may not be searchable, private communication channels do not appear in client device search results. In certain embodiments, only those users or administrators who have knowledge of and permission to access (e.g., a group-based communication channel identifier for the private group-based communication channel is associated with their user profile after the user has been validated/authenticated) the private group-based communication channel may view content of the private group-based communication channel. By consequence, the content of private communication channels is not considered when compiling search results according to certain embodiments. In either instance (e.g., public communication channels or private communication channels), client devices are initialized as members of a particular communication channel (e.g., added to a roster of members of the communication channel) prior to enabling content exchange by the client devices within the communication channel.

Certain communication channels, such as public group-based communication channels, may be visible to non-member client devices having access to the group in which the communication channel is associated via a search interface enabling non-member client devices to request initiation into the membership of a particular communication channel. Client devices may provide search parameters via the search interface to look-up one or more communication channels within a particular group matching the provided search parameters, and the data identifying the communication channels determined to match the provided search parameters are transmitted to the client device as selected results that may optionally be selected by the client device to request membership within a particular communication channel. The selected results may be supplemented by one or more sets of auxiliary results comprising targets to one or more additional communication channels deemed relevant to the provided search parameters based at least in part on one or more similarities identified between the selected results and one or more additional communication channels. The similarities may be identified as direct similarities between the search parameters and the one or more auxiliary results, or the similarities may be identified as derivative similarities between the selected results and the auxiliary results. For example, the derivative similarities may be identified based on similarities in participant groups between the selected results and the auxiliary results, similarities in metadata (e.g., content of a topic field) between the selected results and the auxiliary results, and/or the like.

The "search parameters" may be manually generated, in whole or in part, by a user of the client device (e.g., via an input interface of the client device) as alphanumeric text, symbols, emojis, and/or the like; or the search parameters may be automatically generated, in whole or in part, by the client device (e.g., based at least in part on machine-learning results generated based at least in part on data stored locally on the client device). For example, the search parameters may be automatically generated based at least in part on suggestion data identifying popular search terms and/or other suggested search terms. The suggestion data may be generated at a centralized group-based communication server periodically (e.g., daily) and transmitted to the client devices to enable localized generation of suggested search terms. Moreover, the suggestion data may be personalized by the client device based on recent and/or frequent activity (e.g., recently and/or frequently visited group-based communication channels may be displayed higher than general search suggestions generated based at least in part on the suggestion data. The automatically generated search parameters may be automatically updated as a user begins providing suggested search terms. For example, new suggested search parameters may be provided based on text entered by a user, such that the suggested search parameters begin with the text entered by the user. Thus, the client device may refine the automatically generated search parameters based at least in part on user input.

As discussed herein, the search parameters may be utilized to identify communication channel identifiers matching the search parameters, and/or to identify communication channels associated with one or more characterizing terms matching the search parameters. "Matching" terms (whether those terms encompass communication channel identifiers or characterizing terms) may encompass exact matches or fuzzy matches (e.g., utilizing an algorithm identifying matches based on an exact match between a threshold percentage of characters within the search parameters; utilizing an algorithm identifying matches between the search parameters and known synonyms to those search parameters (as stored in a database), and/or the like).

Moreover, the "characterizing terms" that may be utilized to identify matches between communication channels and search parameters may be generated based on the results of the application of one or more machine learning algorithms to the content of each of the plurality of communication channels. The characterizing terms may be terms summarizing the content (or a portion of the content, such as the most recent content) exchanged within a communication channel, terms determined to be relatively unique (e.g., utilized infrequently) across a plurality of communication channels, but utilized relatively frequently within a particular communication channel. As just one example, a term frequency-inverse document frequency (Tf-idf) algorithm may be applied to identify one or more characterizing terms associated with a particular communication channel.

The term "group-based communication channel interface" refers to a virtual communications environment or feed that is configured to display content exchanged within the group-based communication channel via messaging communications posted by channel members (e.g., validated users accessing the environment using client devices) that are viewable only to the members of the group. The format of the group-based communication channel interface may appear differently to different members of the group-based communication channel; however, the content of the group-based communication channel interface (i.e., messaging communications) will be displayed to each member of the group-based communication channel. For instance, a common set of group-based messaging communications will be displayed to each member of the respective group-based communication channel such that the content of the group-based communication channel interface (i.e., messaging communications) will not vary per member of the group-based communication channel. Moreover, group-based communication channel interfaces are unique to a particular user (and/or client device) and group-based communication channel. Thus, switching from a first group-based communication channel to a second group-based communication channel via a client device causes the client device to switch to a second group-based communication channel interface associated with the second group-based communication channel.

Similarly, "group-based communication interfaces" refer to virtual workspace environments configured to display content associated with a particular group via a client device. Group-based communication channel interfaces associated with particular group-based communication channels are accessible via a group-based communication interface associated with a group encompassing the particular group-based communication channels. The group-based communication interface may comprise or otherwise make available a search function to the user to search for group-based communication channels available within the group that is associated with the particular group-based communication interface. In embodiments in which the group-based communication platform 105 supports a plurality of groups each having a plurality of associated group-based communication channels, the search functionality is configured to perform various search methodologies on only a subset of the entire plurality of group-based communication channels supported by the group-based communication platform 105. Specifically, the search functionality performs various search methodologies only across the plurality of group-based communication channels associated with a particular group.

As mentioned, users may be associated with a plurality of groups, and therefore the client-device used by the user to access various group-based communication channel interfaces may be configured to alternatively display group-based communication interfaces associated with each of the groups for which the user is a member. Thus, switching from a first group-based communication channel associated with a first group to a second group-based communication channel associated with a second group causes the client device to switch to a second group-based communication interface associated with the second group and to switch to a second group-based communication channel interface accessible via the second group-based communication interface.

As used herein, the terms "messaging communication" and "message" refer to any electronically generated digital content object provided by a user using a client device and that is configured for exchange between members of a group-based communication channel and display within a group-based communication channel interface. Message communications may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication platform users may join group-based communication channels. Some group-based communication channels may be glob ally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example system architecture 100 within which embodiments of the present invention may operate. Users may access a group-based communication platform 105 via a communications network 103 using client devices 101A-101N.

Communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (e.g., network routers, etc.). For example, communication network 103 may include a cellular telephone, an 802.11, 802.16, 802.20, and/or WiMax network. Further, the communication network 103 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The client devices 101A-101N may be any computing device as defined above. Electronic data received by group-based communication system 105 from the client devices 101A-101N may be provided in various forms and via various methods. For example, the client devices 101A-101N may include desktop computers, laptop computers, smartphones, netbooks, tablet computers, wearables, and the like.

In embodiments where a client device of client devices 101A-101N is a mobile device, such as a smart phone or tablet, the client device of client devices 101A-101N may execute an "app" to interact with the group-based communication platform 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another, and with particular hardware and software components of mobile devices. For example, the mobile operating systems named above each provides frameworks for interacting with location services circuitry, wired and wireless network interfaces, user contacts, and other applications. Communication with hardware and software modules executing outside of the app is typically provided via application programming interfaces (APIs) provided by the mobile device operating system.

In some embodiments, the client device of client devices 101A-101N interacts with the group-based communication platform 105 via a web browser. As yet another example, the client device of client devices 101A-101N may include various hardware or firmware designed to interface with the group-based communication platform 105.

In some embodiments of an exemplary group-based communication platform 105, content in the form of a message or messaging communication may be sent from a client device 101A-101N to a group-based communication platform 105 for content exchange among member client devices within a group-based communication channel. In various implementations, content may be sent to the group-based communication platform 105 over communication network 103 directly by one of the client devices 101A-101N. The content may be sent to the group-based communication platform 105 via an intermediary such as a message server, and/or the like. For example, a client device 101A-101N may be a desktop, a laptop, a tablet, a smartphone, and/or the like that is executing a client application (e.g., a group-based communication app). In one implementation, the content may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

POST /authrequest.php HTTP/1.1
Host: www.server.com

Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL
<digital_cert_link>www.mydigitalcertificate.com/
JohnDoeDaDoeDoe@gmail.com/mycertificate.dc</digital_cert_link>
            //OPTIONAL
<digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S Build/IMM76D) AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXZ</client_serial_number>
        <client_UDID>FXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3) AppleWebKit/537.75.14 (KHTML, like Gecko) Version/7.0.3 Safari/537.75.14</user_agent_string>
        <client_product_type>MacPro5,1</client_product_type>
        <client_serial_number>YXXXXXXXXZ</client_serial_number>
        <client_UDID>FXXXXXXXX-XXXX-XXXX-XXXX-XXXXXXXXXXXX</client_UDID>
        <client_OS>Mac OS X</client_OS>

-continued

```
    <client_OS_version>10.9.3</client_OS_version>
    <client_app_type>web browser</client_app_type>
    <client_name>Mobile Safari</client_name>
    <client_version>537.75.14</client_version>
  </client_details>
  <message>
    <message_identifier>ID_message_10</message_identifier>
    <team_identifier>ID_team_1</team_identifier>
    <channel_identifier>ID_channel_1</channel_identifier>
    <contents>That is an interesting invention. I have attached a copy our patent policy.</contents>
    <attachments>patent_policy.pdf</attachments>
  </message>
</auth_request>
```

The group-based communication system 105 comprises at least one group-based communication server 113 that may create a storage message based upon the received message to facilitate message storage in one or more databases 115. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 113 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
      <topic>inventions</topic>
      <topic>patents</topic>
      <topic>policies</topic>
    </topics>
    <responses>
      <response>liked by ID_user_2</response>
      <response>starred by ID_user_3</response>
    </responses>
    <contents>That is an interesting invention. I have attached a copy our patent policy.</contents>
    <attachments>patent_policy.pdf</attachments>
    <conversation_primitive>
        conversation includes messages: ID_message_8, ID_message_9, ID_message_10,
        ID_message_11, ID_message_12
    </conversation_primitive>
</storage_message>
```

In some embodiments, a group identifier as defined above may be associated with the message. In embodiments, a group-based communication channel identifier as defined above may be associated with the message. In some embodiments, a sending user identifier as defined above may be associated with the message. In one implementation, the message may be parsed (e.g., using Pre Hypertext Processor (PHP) commands) to determine a sending user identifier of the user who sent the message.

In some embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:
SELECT messageResponses
FROM MSM_Message
WHERE messageID=ID_message_10.

As described further hereinafter, the above MySQL database command may be modified and used to generate documents for live or computed indexing (via MySQL queries for live indexing in the interface component 117).

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) and/or to facilitate various facets of searching. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

In some embodiments, the group-based communication platform 105 comprises a group-based communication server 113, one or more databases 115, and an interface component 117 (e.g., embodied as an Application Programming Interface (API) component).

The group-based communication server 113 may be embodied as a computer or computers. The group-based communication server 113 may provide for receiving of electronic data from various sources, including but not limited to the client devices 101A-101N. For example, the group-based communication server 113 may be operable to receive and post or transmit group-based messaging communications provided by the client devices 101A-101N via communications network 103.

The interface component 117 may be embodied in one or more computers or computing apparatus, such as a server or servers. The interface component 117 may be a set of routines, protocols and software system tools that facilitate the data transmission among and between various components of the group-based communication system 105. For example, the interface component 117 may receive queries from client devices 101A-101N via the communications network 103. It may also receive data from and transmit data to the group-based communication server 113. The interface component 117 may also transmit data to the one or more databases 115. In certain embodiments, the interface component 117 is embodied as a plurality of geographically distributed servers, each located within a particular region such that the distributed interface components 117 communicate with client devices 101A-101N located within the same geographical region. However the interface component 117 may be a centralized component in communication with, or formed as a part of the group-based communication server 113.

In certain embodiments, the interface component 117 provides routines for a client device 101 to submit search parameters to be utilized by the group-based communication server 113 (and/or one or more databases 115) to identify one or more group-based communication channels having an associated channel identifier and/or characterizing terms matching the provided search parameters. Thus, the interface component 117 is operable as a data transmission interface to enable one or more client devices 101 to transmit data to the group-based communication server 113 in a manner enabling the group-based communication server 113 to process search requests together with the provided search parameter data. The interface controller 117 may similarly provide for transmitting data from the group-based communication server 113 to the one or more client devices 101A-101N. For example, the group-based communication server 113 may transmit selected search results (e.g., targets identifying one or more group-based communication channels matching search parameters) to a requesting client device 101. As mentioned above, the interface component 117 may further enable content exchanged within a particular group-based communication channel to be transmitted to the client device members of the particular group-based communication channel.

The one or more databases 115 may be embodied as a data storage device(s) such as a Network Attached Storage (NAS) device or devices, or as a separate database server or servers. In some embodiments, the one or more databases 115 are relational database(s), such as MySQL database(s). The one or more databases 115 include information accessed and stored by the group-based communication server 113 and transmitted from interface component 117, and facilitate the operations of the group-based communication server 113. For example, the one or more databases 115 may include, without limitation, content exchanged among client device members of one or more group-based communication channels, thereby enabling content analysis of the content exchanged within each of the one or more group-based communication channels.

In this regard, the one or more databases 115 may serve as the primary data storage of the group-based communication system 105. As described hereinafter, the one or more databases 115 store backups (snapshots) of the data storage, and makes these backups available for index generation processes.

Moreover, the group-based communication server 113 according to certain embodiments is configured to, with the one or more databases 115, analyze the content exchanged among client device members of one or more group-based communication channels (e.g., via machine-learning algorithms) to determine one or more characterizing terms that may at least partially characterize content exchanged within a particular group-based communication channel. The characterizing terms may be selected to be reflective of the entire history of content exchanged within a group-based communication channel, or the characterizing terms may be selected to be reflective of a portion of the content exchanged within the group-based communication channel (e.g., over the most recent predefined time period (e.g., over the last week), over the most recent predefined number of messages (e.g., over the last 10 messages exchanged), and/or the like). The one or more characterizing terms may be selected via a machine-learning algorithm configured to identify particular terms of a plurality of terms exchanged within messages in the group-based communication channel as being of a particular level of relevance for the group-based communication channel. Once determined, the characterizing terms may be stored within the one or more databases 115 in association with respective group-based communication channels (e.g., as metadata stored within the group-based communication channels).

As discussed herein, the group-based communication server 113 performs the machine-learning content analysis within individual groups (e.g., encompassing a plurality of group-based communication channels) to identify characterizing terms associated with a particular group-based communication channel relative to all content exchanged among a plurality of group-based communication channels (e.g., public group-based communication channels) associated with a particular group. Thus, the machine learning algorithm may be applied individually to content having a particular group identifier (e.g., content exchanged within group-based communication channels having associated metadata identifying a single group identifier). The results of the content analysis may identify characterizing terms associated with particular group-based communication channels based on metadata associated with the particular message(s) in which the characterizing terms are used (e.g., metadata identifying a channel identifier for the message).

In certain embodiments, one or more group-based communication channels may be associated with a plurality of individual groups. Such group-based communication channels may be included within a subset of group-based communication channels searched from each of the associated groups. Moreover, in instances in which one or more of these cross-group channels (e.g., having members in each of a plurality of groups) is identified within a particular search result, these cross-group, group-based communication channels may be identified within the search results (e.g., with a particular identifier) as being associated with a plurality of groups.

As just one example, the group-based communication server 113 is configured to identify characterizing terms for one or more group-based communication channels by performing a Term frequency-inverse document frequency (Tf-idf) analysis of content exchanged within one or more group-based communication channels relative to the content exchanged within a larger grouping of a plurality of group-based communication channels. The Tf-idf analysis may encompass steps for reviewing content exchanged within a plurality of group-based communication channels (e.g., group-based communication channels associated with a particular group) to identify terms that are used relatively rarely within any of the analyzed group-based communication channels. The group-based communication channels reviewed during this step may encompass all group-based communication channels active over the group-based communication platform 105, all public group-based communication channels active over the group-based communication platform 105, all group-based communication channels associated with a particular group, all public group-based communication channels associated with a particular group, and/or the like.

With reference to the illustration of FIG. 4, which does not provide any limitations as to database storage mechanisms and/or database structures by which data is stored, an example is provided for illustrating the scope of content analysis (e.g., Tf-idf analysis) performed according to certain embodiments. The group-based communication platform 105 of the illustrated embodiment is configured to support and/or otherwise enable communication between a plurality of distributed client devices within a plurality of groups including, for example, Group X and Group Z. As discussed herein, messages or other content exchanged via the group-based communication platform 105 have associated metadata comprising a group identifier and a channel identifier for the message to ensure proper distribution and/or privacy for the message within a particular group and channel.

As mentioned above, the group-based communication server 113 is configured to perform content analysis to identify characterizing terms associated with individual group-based communication channels based on content exchanged within a particular group. With reference to FIG. 4, the content analysis is performed separately for Group X and Group Z to identify characterizing terms within Group X separately from characterizing terms identified with respect to Group Z. More specifically, a Tf-idf analysis may be performed while only considering messages and/or other content having associated metadata having a Group X group identifier to identify characterizing terms utilized within Group X, and a second, separate Tf-idf analysis may be performed while only considering messages and/or other content having associated metadata having a Group Z group identifier to identify characterizing terms utilized within Group Z. The results of these analyses may be stored in the database 115.

This first step of the analysis serves to exclude relatively common terms (e.g., articles, various adjectives, pronouns, commonly utilized nouns and verbs, and/or the like) from further consideration. Terms utilized relatively infrequently and/or terms otherwise flagged as being of interest for further consideration are identified through this first step of the analysis, such as the non-limiting examples of: industry- or enterprise-specific terms of art (e.g., "Operation System," "Cloud Server," "User Interface"), various abbreviations (e.g., "MySQL," "JSON," "Messaging API"), project codenames, project titles, specific geographical areas, and/or the like. In certain embodiments, flagged terms may be identified as (1) being terms constituting less than a threshold percentage of the total number of terms used, (2) matching terms identified by an external source as being deemed infrequently used, (3) being a predefined number of the least-used terms within the data set, (4) being used within the least number of channels, and/or the like.

In the example shown in FIG. 4, the terms "pop-up" and "ARR" are identified as flagged terms within communication channels associated with Group X (e.g., based on metadata having a Group X group identifier associated with the individual messages in which these terms are utilized), and the terms "mountain," "silos," and "domination" are identified as flagged terms in Group Z (e.g., based on metadata having a Group Z group identifier associated with the individual messages in which these terms are utilized). For purposes of discussion, these identified flagged terms are shown within individual dashed boxes in FIG. 4. Moreover, although the term "pop-up" is also used within the #Hiking channel of Group Z, because the content-analysis methodology is performed within individual groups, the term "pop-up" is not identified as a flagged term within Group Z. For example, the term "pop-up" may be used with high frequency throughout Group Z, or the term may not satisfy one or more other criteria for being identified as an infrequently used term.

Once flagged terms are identified across a plurality of group-based communication channels, the group-based communication server 113 identifies flagged terms that are used within each individual group-based communication channel to identify terms that may characterize the content exchange within the group-based communication channel. The identified terms to be associated with a particular group-based communication channel may be utilized within messages having metadata identifying the group-based communication channel more than a threshold number of times, may constitute more than a threshold percentage of the terms utilized in content exchange having metadata identifying the group-based communication channel, and/or the like to be identified as being reflective of at least a portion of a content exchange within the group-based communication channel. These "characterizing terms" are then associated with the group-based communication channel to be utilized for later searches performed by individual client devices 101 seeking one or more group-based communication channels. Again referring to the example shown in FIG. 4, the term "pop-up" may be associated with the #advertising communication channel and the term "ARR" may be associated with both the #business and #cs-expansion-emec channels of Group X. The term "mountain" may be associated with both the #Hiking and #factory-expansion channels, the term silo is associated with the #factory-expansion channel, and the term "domination" is associated with the #interstellar-expansion channel. As illustrated in FIG. 4, multiple terms may be associated with a single channel.

The group-based communication server 113 may perform the content analysis periodically (e.g., daily) to maintain an updated listing of characterizing terms associated with the group-based communication channels. As yet another example, the group-based communication server 113 may perform the content analysis in real-time in response to search queries received from one or more client devices 101. In certain embodiments, the updated listing of characterizing terms associated with each group and each group-based communication channel is stored within database 115 to be accessible to the group-based communication server 113.

The terms included within the first and/or second steps of the analysis may encompass terms used within the body of various messages exchanged within the group-based communication channel. In certain embodiments, various terms may encompass terms utilized in metadata (e.g., metadata associated with various messages, metadata associated with message attachments, such as attachment titles, and/or the like) and/or content of one or more attachments (e.g., substantive content of attachments, such as the body of an attached .docx attachment).

As mentioned, the group-based communication server 113 may be configured to execute search query requests received from one or more client devices 101. The search queries of various embodiments contain search parameters (e.g., search terms) received from the one or more client devices 101A-101N. The search parameters generated by the one or more client devices 101A-101N may be generated based at least in part on user input received by the client devices 101A-101N (e.g., provided via a user interface as discussed herein). In such embodiments, the client devices 101A-101N may be configured to be in at least substantially constant communication with the group-based communication server 113 while receiving user input of search parameters to enable the group-based communication server 113 to provide real-time, "search as you type" functionality (e.g., with an autocomplete functionality to automatically complete suggested words and/or phrases within the search parameters as a user is providing the user input). As yet another example, the client devices 101A-101N may be configured to generate a discrete search request including completed user-provided search parameters after receipt of specified user input (e.g., a user selecting a "submit" button on a user interface). In such embodiments, the client devices 101A-101N may be configured to periodically transmit data to the group-based communication server 113 and/or to transmit data only after receipt of user input requesting such data transmission.

In certain embodiments, the client devices 101A-101N are configured to generate the search parameters, in whole or in part, automatically based at least in part on one or more data files stored locally on the requesting client device 101. For example, the client devices 101A-101N may be configured to automatically generate and transmit search parameters as a part of a search request based at least in part on files identifying group-based communication channels previously viewed (e.g., most recently viewed channels, most frequently viewed channels, and/or the like); based at least in part on files identifying content previously shared via one or more group-based communication channels (e.g., text of messages previously shared, file names of attachments previously shared, and/or the like); and/or the like.

Moreover, the client devices 101A-101N may be configured to transmit search queries to the group-based communication server 113 after performing one or more local search functions based at least in part on data stored locally on the client device. For example, the client devices 101A-101N utilize the search parameters to search for locally stored data identifying one or more recently (identified as satisfying one or more recency criteria) or frequently (identified as satisfying one or more frequency criteria) visited group-based communication channels having a channel identifier matching the search parameters. With reference briefly to FIG. 4, if a user who frequently participates in the #advertising channel of Group X performs a search for the term "advertising" via a client device 101, the client device 101 may provide a search result to the user identifying the #advertising channel. In certain embodiments, the results of this local search may be presented together with results of a search performed via the group-based communication server 113 (e.g., within a single user interface).

The group-based communication server 113 may be configured to execute the search query requests received from one or more client devices 101A-101N by querying one or more attributes of various group-based communication channels to identify matches with the search parameters provided with the search request. The queried attributes of the group-based communication channels may comprise the channel identifier, the one or more characterizing terms associated with the group-based communication channel, and/or the like. Matches between the search parameters and attributes of the one or more group-based communication channels may be established by exact matches between the terminology of the search parameters and the terminology used with one or more of the attributes, fuzzy-matches (e.g., constituting a less-than-exact match between the search terms and the one or more attributes), and/or the like.

In certain embodiments, the group-based communication server 113 may be configured to further execute the search query requests based at least in part on user-specific channel attributes that may be stored locally on a client device 101A-101N and/or at a group-based communication server 113. These user specific channel attributes may, in certain embodiments, comprise machine-learned channel attributes for the particular user, and may comprise information/data such as identifiers of particular groups of users that a particular user interacts with, and/or the like).

In certain embodiments, the group based communication server 113 records (e.g., in the one or more databases 115; in a separate memory device; and/or the like) data indicative of a matching methodology utilized to justify the selection of a particular group-based communication channel as matching the search parameters. The matching methodology may effectively provide a reasoning as to why a particular group-based communication channel is selected, and data indicative of the matching methodology may be provided with the search results when transmitted to the client device 101.

The group-based communication server 113 may be configured to identify a plurality of matching group-based communication channels during the search query. Prior to presentation of the search results to the requesting client device however, the group-based communication server 113 may hierarchically rank, score, and/or filter the search results to generate a ranked results set. For example, the group-based communication server 113 may be configured to hierarchically rank and/or score the search results based on relevance criteria (e.g., rank based on the number of times a term of the search parameters appears in a particular channel; based on how recently a term of the search parameters appears in a particular channel; based on where a term of the search parameters appear (e.g., appearing in a channel identifier may be ranked higher than appearing in a message shared within the channel); and/or the like). Moreover, the group-based communication server 113 may filter the results prior to transmitting the same to the client device. The filtered results may comprise a selected number of the most-relevant results (as determined based at least in part on the hierarchical ranking). For example, the filtered results may comprise the 3 most-relevant results.

The group-based communication server 113 may be configured to perform one or more auxiliary searches based at least in part on the filtered results generated by the group-based communication server 113. For example, the group-based communication server 113 may identify participants of the group-based communication channels identified within the filtered search results (e.g., by identifying users having a user profile identifying the user as a member of one or more of the filtered search result group-based communication channels, by identifying user identifiers within metadata associated with content exchanged within the group-based communication channels, and/or the like), and the group-based communication server 113 searches for and identifies one or more auxiliary search results identifying group-based communication channels having the same or a similar list of participants in the group-based communication channels of the filtered search results. For example, if users "Kim," "Zach," and "Chloe" are all participants of a group-based communication channel having a characterizing term matching the search parameters, the group-based communication server 113 identifies a second group-based communication channel in which all of Kim, Zach, and Chloe are also members as an auxiliary search result.

The group-based communication server 113 may hierarchically rank, score, and/or filter the auxiliary search results to generate a ranked auxiliary results set. For example, the group-based communication server 113 may be configured to hierarchically rank and/or score the auxiliary search results based on relevance criteria (e.g., rank based on the number of participants matching the participants within group-based communication channels identified in the results set; based on the number of additional participants within each channel; and/or the like). Moreover, the group-based communication server 113 may filter the auxiliary search results prior to transmitting the same to the client device. The filtered auxiliary search results may comprise a selected number of the most-relevant results (as determined based at least in part on the hierarchical ranking). For example, the filtered auxiliary results may comprise the 3 most-relevant results. These filtered auxiliary results may be combined with the previously identified results set to be transmitted to the client device 101.

Figure 6:
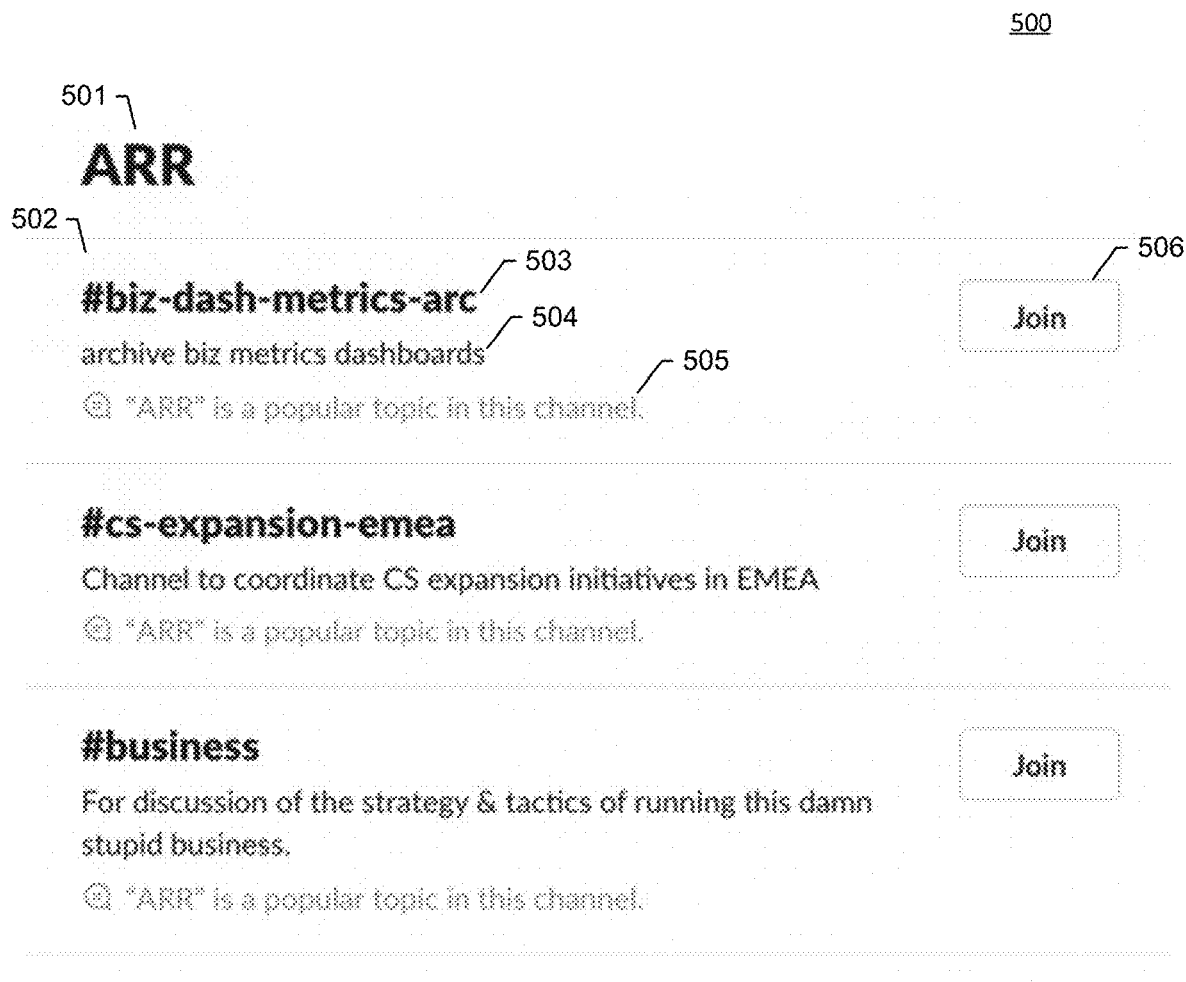
FIG. 6 shows an example results interface according to one embodiment.

The results are then transmitted to the requesting client device 101 for presentation via a search user interface. The results may be presented in the form of targets (e.g., hyperlinks) that may be selectably executable by the client device (e.g., in response to user input selecting a particular target) to generate and transmit a request message including the channel identifier for the selected group-based communication channel. As mentioned previously, the results may be presented together with data indicative of the reasoning utilized for including each of the group-based communication channels within the selected results. For example, as indicated at FIG. 6, the "#biz-dash-metrics-arc" channel is included in the results set together with reasoning indicating that the channel was included because the search parameter "ARR" "is a popular topic in this channel." Moreover, the client device 101 receiving the search results may be configured to combine the search results received from the group-based communication server 113 with search results generated locally (e.g., based on a search of recently reviewed group-based communication channels) and to display a composite user interface including search results generated locally and search results generated at the group-based communication server 113.

The selected results generated by the group-based communication server 113 and presented to the client device 101 of certain embodiments are reflective of additional search modifications. For example, the search modifications may reorganize a determined hierarchical ranking based on the amount of activity (e.g., amount of recent content exchange and/or amount of recent content reads) occurring within the one or more group-based communication channels. For example, group-based communication channels having a threshold amount of recent activity (e.g., at least a threshold number of messages exchanged within a set time period (e.g., most recent 24 hours or most recent week); at least a threshold number of members contributing to the content exchange within a set time period; at least a threshold number of members reading content exchanged within a set time period, and/or the like) may be ranked higher (e.g., displayed above) than other channels having similar and/or lower number of instances of search parameter usage. Various thresholds utilized to determine whether a particular group-based communication channel satisfies high-activity criteria may be explicit (e.g., minimum number of messages exchanged, minimum number of readers, and/or the like) or may be determined based on a historical amount of activity within the particular group-based communication channel. For example, high-activity group based communication channels may be identified based on a defined increase over an average (e.g., a moving average based on particular recent time period) amount of activity (e.g., a defined minimum percentage increase). These high-activity search results may be flagged within the selected results presented to the client device (e.g., flagged as "trending" with a corresponding symbol, as shown in the example display of FIG. 9). Determinations of whether a particular group-based communication channel is "trending" may be made periodically (e.g., daily) or in real-time.

As yet another example search modification, group-based communication channels that the requesting client device 101 is already a member of may be ranked higher than other group-based communication channels not previously visited by the client device 101. Such a configuration may facilitate users locating a desired group-based communication channel based on content that the user has seen previously.

In certain embodiments, the various search modifications may be optionally disabled (e.g., via a user interface element displayed via the client device 101 and selectable by the user). In such embodiments, each search query transmitted from the client device 101 may comprise metadata indicating whether the one or more search modifications have been activated or deactivated, thereby ensuring the search query is performed according to a desired configuration.

Moreover, the group-based communication server 113 and/or the client devices 101 may be configured to generate a plurality of search result data sets to be provided to and/or displayed via the client device 101. The plurality of search results data sets may be separated and displayed as discrete data sets relative to one another (e.g., within defined sections of a search results listing) or the plurality of search results data sets may be displayed within a single, indistinguishable display. Moreover, in certain embodiments the results included within the plurality of datasets may be interspersed within the display relative to one another. As just one example, the plurality of results data sets may comprise a first set of selected search results identified based on a comparison between search parameters and characterizing terms associated with the group-based communication channels, a second set of search results identified based on a comparison between the search parameters and channel identifiers (e.g., channel identifiers associated with recently and/or frequently visited group-based communication channels), and a third set of search results may comprise auxiliary search results as discussed herein.

A first set of selected search results may be generated based on a comparison between the search parameters and the characterizing terms associated with each of the plurality of group-based communication channels. These results are thereby reflective of the content exchanged within each group-based communication channels, and the search may omit comparisons with other metadata associated with the group-based communication channels, such as the channel identifier and/or other descriptive metadata fields associated with the group-based communication channels. Auxiliary results data sets may formulate another set of search results, and may be based on comparisons between the search parameters and various metadata of group-based communication channels (omitting comparisons to the content exchanged therein); and/or based on derivative search parameters generated based on various attributes of group-based communication channels identified within the first set of selected search results. As one example, the auxiliary results data sets may identify group-based communication channels having channel identifiers matching the search parameters (thereby enabling users to search for specific group-based communication channels having known channel identifiers). As another example, the auxiliary results may be reflective of the results of a derivative search query. The derivative search query may, as one example, retrieve data indicative of the identities of existing client device members within each of the group-based communication channels identified within the first set of selected results, and may query the plurality of additional group-based communication channels to identify other channels having the same or similar groups of members. These auxiliary search results are thus reflective of other group-based communication channels used by the same or similar groups of users (and their associated client devices 101A-101N), and those groups may discuss other topics that a user may find relevant to the original search parameters provided via the client device 101.

Example Apparatuses Utilized with Various Embodiments

Figure 2:
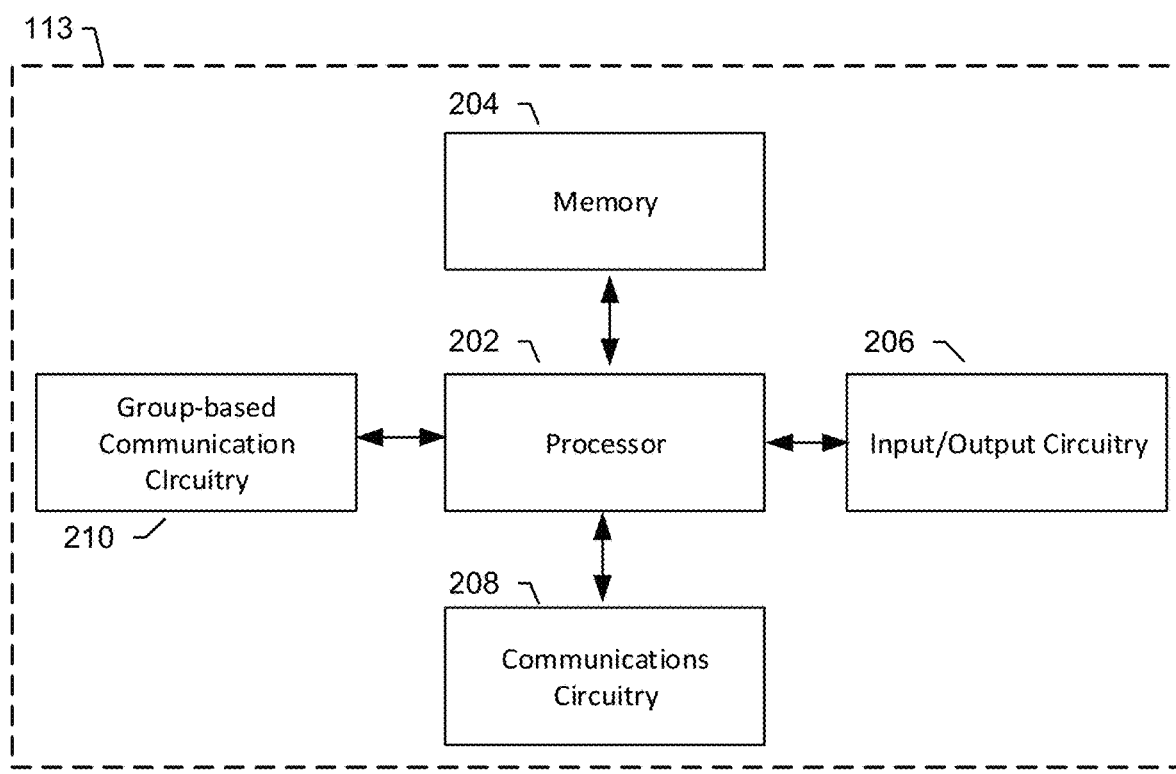
FIG. 2 shows a schematic of an example hardware apparatus of a group-based communication server according to one embodiment.

The group-based communication server 113 may be embodied by one or more computing systems, such as apparatus 200 shown in FIG. 2. The apparatus 200 may include a processor 202, a memory 204, input/output circuitry 206, communications circuitry 208, group-based communication circuitry 210, and group-based communication repository 212. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory 204 may be an electronic storage device (e.g., a computer readable storage medium). The memory 204 may be configured to store information, data, content, applications, instructions (e.g., computer program instructions (also referred to herein as program code instructions)), or the like, for enabling the apparatus 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 210 includes hardware configured to support a group-based communication system. The group-based communication circuitry 210 may utilize processing circuitry, such as the processor 202, to perform these actions. The group-based communication circuitry 210 may execute content exchange analysis on the content of one or more group-based communication channels to identify characterizing terms associated with those channels. Moreover, the group-based communication circuitry 210 may execute search requests received from one or more client devices 101A-101N, and to generate and transmit results of those searches to the requesting one of the one or more client devices 101A-101N.

Moreover, the group-based communication circuitry 210 may be configured to receive requests from a client device 101 to join a particular group-based communication channel (e.g., generated by selecting a group-based communication channel reflected in search results provided to the client device 101), wherein the received request comprises a target pointing to the requested group-based communication channel. The group-based communication circuitry 210 may initialize the client device 101 as a member of the group-based communication channel to enable data exchange with other members of the channel. For example, the group-based communication circuitry 210 may update a listing of members of the group-based communication channel (e.g., stored within the one or more databases 115), such that content exchanged within the group-based communication channel is accessible to and/or transmitted to the client device 101.

As described above and as will be appreciated based on this disclosure, various embodiments may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Figure 3:
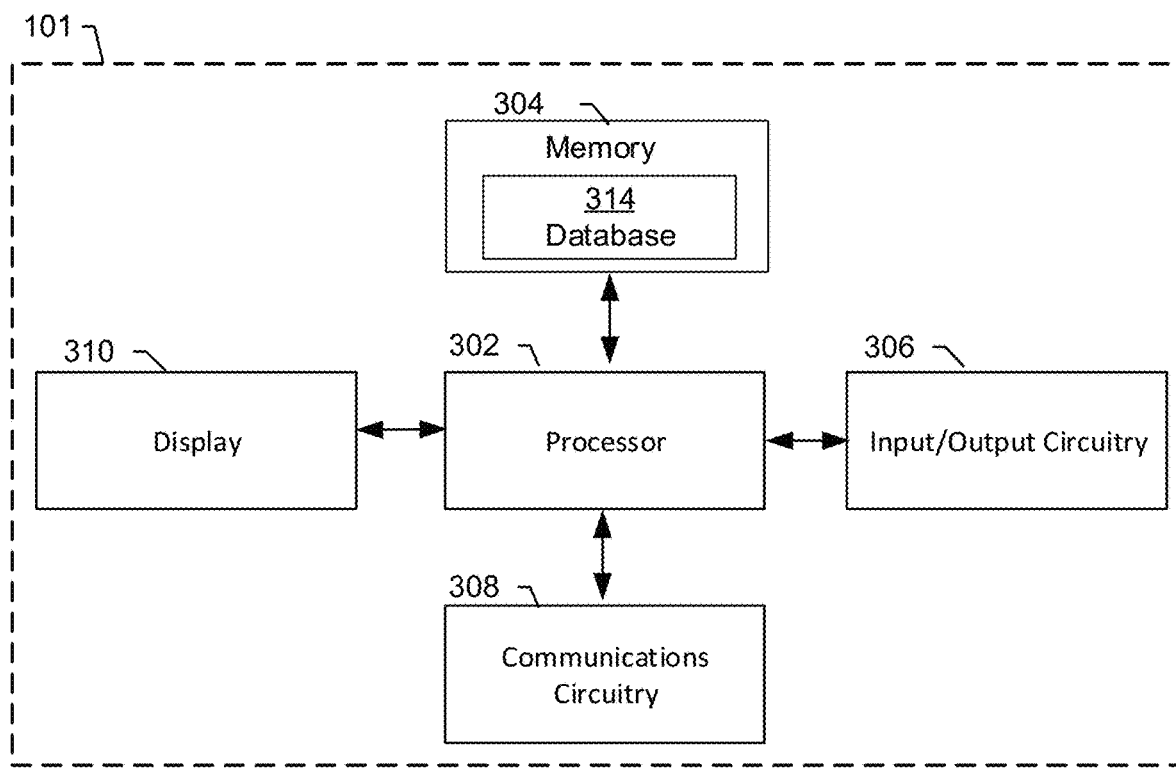
FIG. 3 shows a schematic of an example hardware apparatus of a client device according to one embodiment.

Referring now to FIG. 3, a client device(s) 101 (e.g., client devices 101A-101N) may be embodied by one or more computing systems, such as apparatus 300 shown in FIG. 3. The apparatus 300 may include processor 302, memory 304 which includes a database 314 (e.g., also referred to herein as permitted database 314), input/output circuitry 306, communications circuitry 308, and display 310. Although these components 302-314 are described with respect to functional limitations, it should be understood that the particular implementations necessarily include the use of particular hardware. It should also be understood that certain of these components 302-314 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention. The memory 304 may include a database 314 which may store group-based communication platform query data and/or data files indicative of prior activity of the client device 101 with respect to one or more group-based communication channels (e.g., recent content exchange; recent views of group-based communication channels; and/or the like). These data files may be utilized by the processor 202 when crafting search parameters (e.g., automatically) to be presented to the group-based communication server 113 when searching for group-based communication channels.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display 310, and may comprise a web user interface, a mobile application, a client device, a kiosk, or the like. In some embodiments, the input/output circuitry 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. Similarly, other elements of the apparatus 300 may provide or supplement the functionality of particular circuitry. For example, the processor 302 may provide processing functionality, the memory 304 may provide storage functionality, the communications circuitry 308 may provide network interface functionality, and the like.

As will be appreciated, any such computer program instructions (e.g., program code instructions) and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flows

Various embodiments provide mechanisms for managing group membership within group-based communication channels via a group-based communication server 113. Through the configurations discussed herein, the group-based communication server 113 facilitates the process of locating a particular group-based communication channel for one or more client devices 101A-101N to join, and initiates the client device(s) 101 as a member of a selected one of the plurality of group-based communication channels.

Various aspects of the described process are visible to users of client devices 101A-101N via search user interfaces generated by the display 310 of client devices 101A-101N. Various user interfaces may be displayed as overlaid pop-up style user interface screens displayed over a portion of a group-based communication interface provided to a user of a client device 101. Example user interface screens are shown in FIGS. 5-9. Portions of the user interface screens may be scrollable to display additional information that visibly appears to be located below a bottom edge of the user interface screen. For example, a list of search results may be provided via a scrollable portion of the user interface screen, wherein scrolling through the provided list sequentially displays items of information included in the list.

Moreover, various portions of the user interfaces may comprise fillable fields, such as fillable fields for users to provide (via user input) data to the user interface, which may be then transmitted to the group-based communication server 113. For example, a fillable form field may be provided for users to enter search parameters to be utilized in the search for one or more group-based communication channels.

Moreover, various aspects may be performed without reference to a specific user interface. For example, the group-based communication server 113 may perform content analysis processes on a plurality of group-based communication channels periodically, without reference to any user interfaces and/or generated requests. The group-based communication server 113 performs the content analysis automatically, and may perform the content analysis at defined time intervals (e.g., daily) to provide updated characterizing terms associated with each of the plurality of group-based communication channels. As discussed herein, these characterizing terms may thereafter be utilized with searches for individual group-based communication channels performed based at least in part on search parameters provided by one or more client devices 101A-101N.

Similarly, determinations of whether particular group-based communication channels are "trending" may be made without specific reference to a particular user interface. The group-based communication server 113 may be configured to review content exchange aspects of various group-based communication channels relative to one or more activity criteria defining threshold frequency-based and/or recency-based criteria for determining whether a particular group-based communication channel has been sufficiently activity to qualify as "trending." For example, the group-based communication server 113 may determine whether a threshold number of messages (or other content types) have been exchanged within a predefined time period (e.g., most recent 24 hours); whether a threshold quantity of members (e.g., a defined number, such as 5 members; or a defined percentage of the total number of members of a group-based communication channel, such as 75%) have added a message to the group-based communication channel within a defined period of time (e.g., most recent 24 hours); whether a threshold quantity of new members (e.g., a defined number, such as 5 new members; or a defined percentage increase in membership (e.g., 125% increase in membership) have joined the group-based communication channel within a defined time period (e.g., most recent 24 hours); and/or the like. As yet another example, "trending" group-based communication channels may be identified based on activity rankings among all of the group-based communication channels associated with a particular group. For example, those group-based communication channels identified as being the most active (e.g., a defined number of group-based communication channels having the most recent activity) may be identified as being trending channels. The trending channels may be identified within a list generated and/or stored by the group-based communication server 113. The list may be a hierarchical list, or otherwise the trending group-based communication channels may be stored based at least in part on the amount of activity occurring within the channel, such that group-based communication channels having the most recent activity are ranked/scored highest.

These determinations may be made periodically, at defined times (e.g., daily), or the determinations may be made in real-time, for example, to automatically update the status of various group-based communication channels substantially immediately after the group-based communication channel satisfies or no longer satisfies the applicable activity criteria utilized to establish a group-based communication channel as trending. These determinations of whether a group-based communication channel is trending (as defined in a list of trending channels) may be later utilized with searches for individual group-based communication channels performed based at least in part on search parameters provided by one or more client devices 101A-101N. In certain embodiments, the generated list of trending group-based communication channels is transmitted to client devices 101A-101N, such that the client devices 101A-101N manipulate search results to be displayed thereon to reflect the trending status of various search results. However, in certain embodiments the generated list of trending group-based communication channels may be stored at the group based communication server 113, and accordingly identifies indicating the "trending" status of various group-based communication channels may be added at the group based communication server 113.

With reference now to the user interface screens illustrated in FIGS. 5-9, data flows enabling various embodiments are described.

Figure 5:
FIG. 5 shows an example introduction search interface according to one embodiment.

FIG. 5 illustrates an example introduction user interface 400 that may be presented to a user (e.g., via a display 310 of a client device 101). As discussed herein, the introduction user interface 400 may be overlaid over a portion of a group-based communication interface. As shown in FIG. 5, the introduction user interface 400 comprises a fillable field 401 configured to accept user input of one or more search parameters to be utilized when performing a search for group-based communication channels. Moreover, the user interface 400 may comprise one or more textual and/or image elements that collectively may provide instructions to a user for utilizing the introduction user interface 400.

The introduction user interface 400 accepts user input provided via the fillable field 401, and the client device 101 generates and transmits a search query to the group-based communication server 113 to begin searching. As discussed herein, the search query comprises search parameters (which may be provided as user input to the fillable field 401 and/or which may be generated automatically by the client device 101 based on locally stored data files within the memory 304). As mentioned, the client device 101 may transmit the search query after performing a local search for group-based communication channels having a channel identifier matching the search parameters and visited frequently and/or recently by the client device 101. In certain embodiments, results generated as a result of the local search may be hierarchically ranked for presentation via a user interface based at least in part on user attributes (e.g., machine-learned preferences for particular channels, recent history of channels visited, and/or the like). Moreover, the search query may be transmitted to the group-based communication server 113 via an interface component 117, which operates to ensure that data from the search query is properly addressed to the group-based communication server 113 to enable the group-based communication server 113 to carry out the requested search utilizing the provided search parameters.

Before discussing the one or more results displays, it should be noted that in embodiments in which the client device 101 at least partially automatically generates search parameters, the introduction user interface 400 may additionally comprise a listing of search results generated based at least in part on the automatically generated search parameters. Although the listing of search results is not displayed in the example user interface of FIG. 5, it should be understood that in certain embodiments the listing of search results may be similar to those discussed herein in reference to the various results displays shown in FIGS. 6-9.

Moreover, after the search parameters are provided to the group-based communication server 113, the server performs a search against various attributes of the plurality of group-based communication channels that may be available to the client device 101. As mentioned above, the search may be performed against characterizing terms generated for each of the plurality of group-based communication channels (generated based on a machine-learning content analysis of each group-based communication channel) as discussed above.

FIG. 6 illustrates a first example results interface 500 that may be displayed to a user upon the user (or the client device 101) providing one or more search parameters. In certain embodiments, the results interface 500 may be displayed as a visual mutation of the introduction user interface 400 illustrated in FIG. 5. For example, the fillable field 401 of the introduction user interface 400 may remain visually stagnant as the user interface changes to the first example results interface 500, and continues to display user-provided input (an example search term "ARR" is provided in the fillable field 501) as evident in the example fillable field 501 illustrated in FIG. 6. The textual and image content of the introduction user interface 400 may be replaced by a results listing 502. In certain embodiments, the user interface as a whole (including the visual boundaries of the user interface, not shown in the figures) may visually change to vertically elongate the user interface to accommodate additional visual space for the results listing 502.

Moreover, the results listing 502 may be populated by the results of the search performed for group-based communication channels based on the provided search parameters. The displayed result may comprise a filtered listing of search results constituting the most relevant search results as determined based at least on a scored and/or hierarchical listing of search results. A larger example result set, on which the results shown in FIG. 6 is based, is shown in FIG. 7. As shown in FIG. 7, the channels: #biz-dash-metrics-arc; #cs-expansion-emea; and #business are the three highest ranked/ highest scoring channel search results. This ranking may be determined based at least in part on the number of times the particular characterizing term/search parameter ("ARR" in this case) appears within content exchanged within the channel; the recency of the most recent appearance of the search parameter within content exchanged within the channel; the number of times the particular characterizing term/ search parameter appears in the channel attributes (e.g., channel identifier), and/or the like. In certain embodiments, the ranking may be determined based at least in part on user-specific channel attributes (e.g., machine-learned user attributes, such as a number of times a particular user has historically visited the channel, a number of times a particular user interacts with existing members of a channel, and/or the like). As shown in FIG. 6, the group-based communication server 113 is configured to transmit the top three search results for display via the client device 101 (although any number of results may be selected for display in various embodiments).

Each displayed search result may include a visual representation of the channel identifier 503 for a group-based communication channel located during the search, a topical caption 504 for the group-based communication channel (if provided within the metadata associated with the group-based communication channel); and an automatically generated justification statement 505 providing a brief explanation regarding why the associated group-based communication channel was included within the results listing 502. For example, the group-based communication channel having the channel identifier: "#biz-dash-metrics-arc" was identified as being selected because the search term "ARR" "is a popular topic in this channel." This and/or similar descriptions may be utilized to indicate that the search term "ARR" was identified as being a characterizing term associated with the group-based communication channel "#biz-dash-metrics-arc".

In certain embodiments, each search result may additionally have an associated user interface button 506 having an associated target (e.g., URL) directing the client device to the associated group-based communication channel. Other aspects of the search result may likewise comprise a target hyperlink to the group-based communication channel (e.g., the visual representation of the channel identifier 503 may be embodied as a hyperlink including the target).

As shown in FIG. 6, a results interface 500 may be configured to provide results of a search based on comparisons between search parameters (e.g., provided via fillable field 501) and characterizing terms associated with one or more group-based communication channels (as evidence based on the automatically generated justification statements 505 accompanying each search result in the included results listing 502). Although not shown in FIG. 5, the results interface 500 may display the results of the search of characterizing terms along with (e.g., displayed below) the results of the local search of frequently and/or recently visited group-based communication channels.

Figure 8:
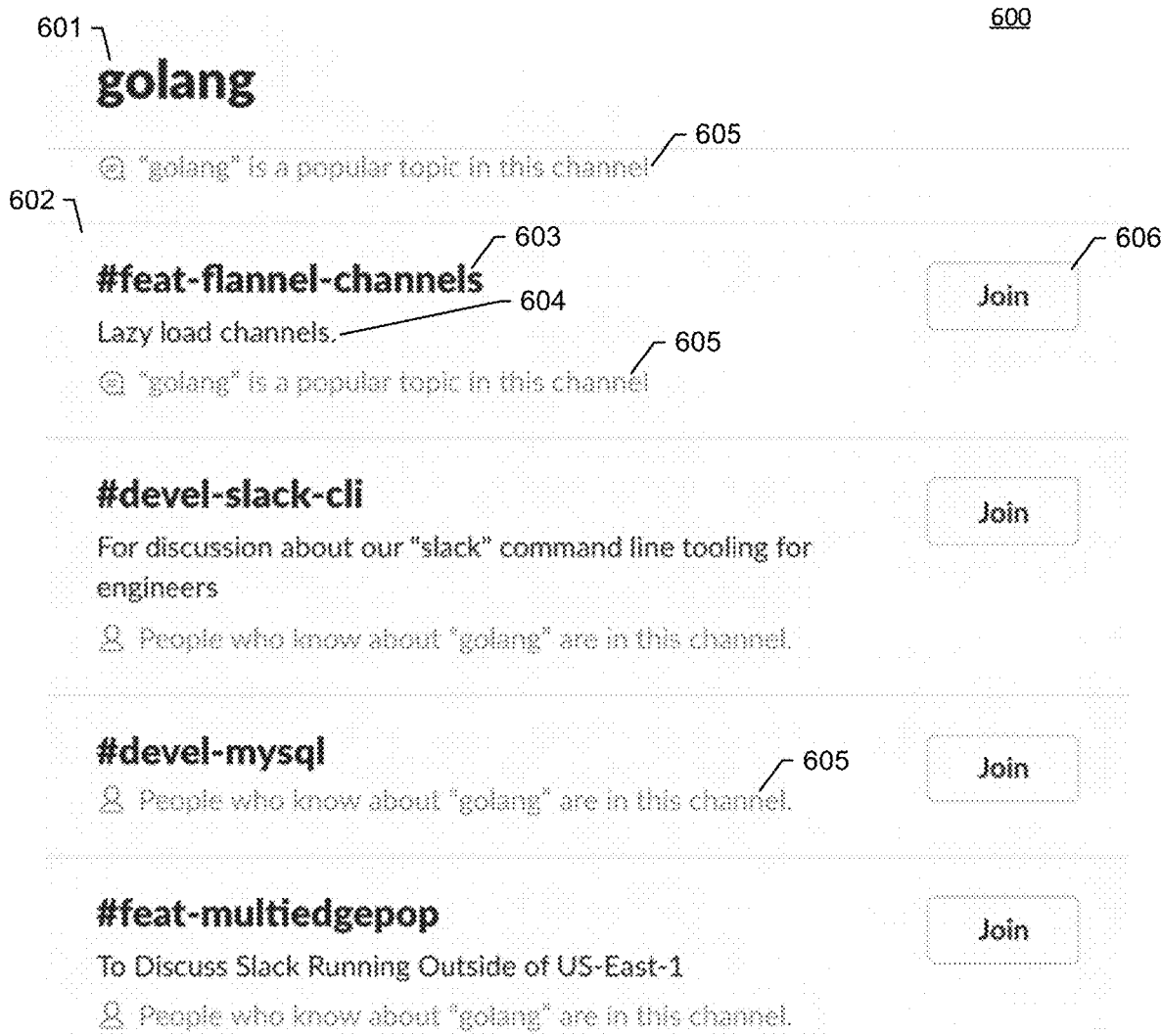
FIG. 8 shows a second example results interface according to one embodiment.

FIG. 8 illustrates a second example results interface 600 that may be displayed to a user upon the user (or the client device 101) providing one or more search parameters. In the case of FIG. 8, the search parameters include the example text "golang."

The second example results interface 600 may comprise one or more elements comparable to those discussed in reference to FIG. 6. For example, the second example results interface 600 comprises a fillable field 601 including a display of the search parameters utilized in the search. The second example results interface 600 further includes a results listing 602 providing a listing of a plurality of group-based communication channels indicated as matching the provided search parameters. Like the results interface 500 displayed in FIG. 6, each search result shown in the embodiment of FIG. 8 comprises a visual representation of the channel identifier 603 for a group-based communication channel located during the search, a topical caption 604 for the group-based communication channel (if provided within the metadata associated with the group-based communication channel); and an automatically generated justification statement 605 providing a brief explanation regarding why the associated group-based communication channel was included within the results listing 602. Moreover, each search result may additionally have an associated user interface button 606 having an associated target (e.g., URL) directing the client device to the associated group-based communication channel. As discussed in reference to FIG. 6, other aspects of the search result may likewise comprise a target hyperlink to the group-based communication channel (e.g., the visual representation of the channel identifier 603 may be embodied as a hyperlink including the target).

The embodiment shown in FIG. 8 further illustrates the scrollable nature of the results listing 602. As evident by the automatically generated justification statement 605 located above the channel identifier "#feat-flannel-channels," other search results are accessible by scrolling up in the results listing 602.

Moreover, the embodiment of FIG. 8 further illustrates that auxiliary search results based on derivative searches and/or comparisons between the search parameters and other attributes of the group-based communication channels may be included in the results listing 602. In the specific example of FIG. 8, multiple results, including the result including channel identifier "#devel-mysql," was justified for inclusion in the results listing because "People who know about 'golang' are in this channel." This and similar automatically generated justification statements 605 may be indicative of a derivative search utilized to justify inclusion in the results listing 605. These listing may have been determined to include the same or a similar grouping of members as other search result group-based communication channels, such as the "#feat-flannel-channels" result, which was justified for inclusion because "'golang' is a popular topic in this channel."

As a specific example, the group-based communication channel #feat-flannel-channels may have members Tommy, Joey, and Suzy. Thus, the group-based communication server 113 is configured to perform a derivative search for other group-based communication channels having the same or similar membership. For example, the group-based communication channel #devel-slack-cli may be identified as having members Tommy, Joey, Suzy, and Louie and the group-based communication channel #general may have a total of 200 members, including Tommy, Joey, and Suzy. The group-based communication server 113 may identify both #devel-slack-cli and #general as being derivative search results based on the inclusion of the same membership as the prior search result #feat-flannel-channels, and the group-based communication server 113 may score and/or otherwise rank the results of this derivative search to give each result a membership similarity score). Because the membership of channel #devel-slack-cli is more similar to the membership of channel #feat-flannel-channels, than #general, devel-slack-cli is ranked higher than #general. The same derivative search and ranking methodology may be performed for a plurality (e.g., all) of the search results generated based on the comparison between the search parameters and characterizing terms of various group-based communication channels. The results of these derivative search and ranking methodologies may be combined into a single ranked set (e.g., based on membership similarity scores), and the highest-scoring results (e.g., top 3 results) may be included within the displayed result set shown in FIG. 8. In the example shown in FIG. 8, the channels #devel-slack-cli; #devel-mysql; and #feat-multiedgepop were identified as having the highest membership similarity scores based on the group membership of all of the displayed results identified based on comparisons between the search parameter "golang" and characterizing terms associated with the group-based communication channels (e.g., including #feat-flannel-channels and two additional results that may be included in portions of the scrollable results list not visible in the view of FIG. 8).

Figure 9:
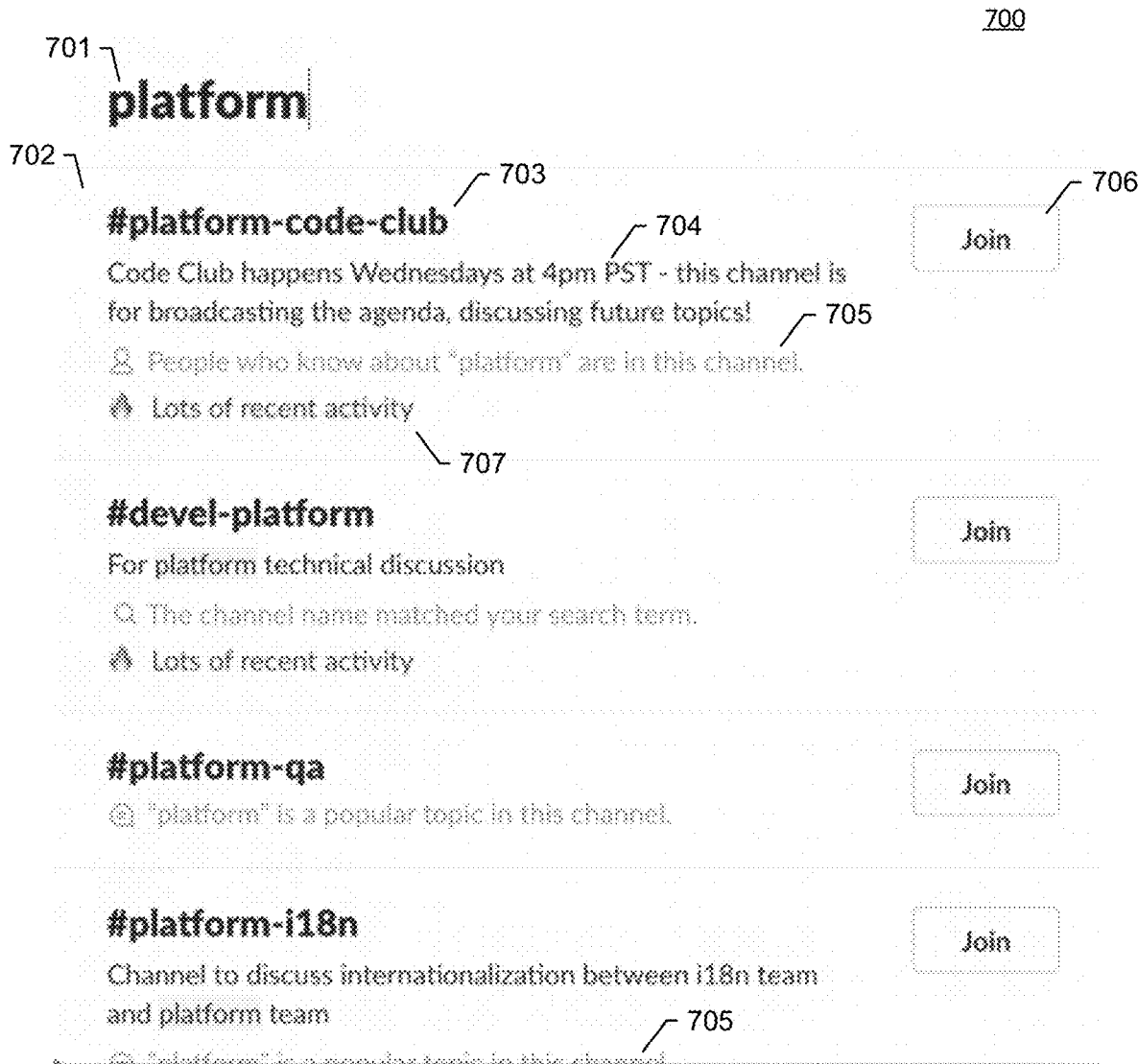
FIG. 9 shows a third example results interface according to one embodiment.

FIG. 9 provides a third example results interface 700 that may be provided via a display 310 of a client device 101. The results interface 700 includes features similar to those discussed in reference to FIGS. 6-8. For example, the third example results interface 700 comprises a fillable field 701 including a display of the search parameters utilized in the search. The third example results interface 700 further includes a results listing 702 providing a listing of a plurality of group-based communication channels indicated as matching the provided search parameters. Like the results interfaces 500, 600 displayed in FIGS. 6-8, each search result shown in the embodiment of FIG. 9 comprises a visual representation of the channel identifier 703 for a group-based communication channel located during the search, a topical caption 704 for the group-based communication channel (if provided within the metadata associated with the group-based communication channel); and an automatically generated justification statement 705 providing a brief explanation regarding why the associated group-based communication channel was included within the results listing 702. Moreover, each search result may additionally have an associated user interface button 706 having an associated target (e.g., URL) directing the client device to the associated group-based communication channel. As discussed in reference to FIG. 6, other aspects of the search result may likewise comprise a target hyperlink to the group-based communication channel (e.g., the visual representation of the channel identifier 703 may be embodied as a hyperlink including the target).

Moreover, the third example results interface 700 illustrates that certain search results (those deemed to satisfy activity criteria for classifying a particular search result as trending) may have an associated trending identifier 707 (e.g., comprising a symbol and a textual description of the identifier). As is evident based on the results listing 702 illustrated in FIG. 9, the trending results may be displayed at the top of the results listing 702, to provide users with an indication of which group-based communication channels are currently popular and/or have a substantial amount of recent activity.

In certain embodiments, the status of a particular channel as trending may not influence which channels are included in the filtered search results displayed via the client device, but may influence the order in which those channels are displayed. With reference to the example of FIG. 9, the #platform-code-club channel may have been identified as having one of the top three membership similarity scores within the results listing, and the channel may have been promoted to the top of the displayed results list because of the channel's trending status.

In other embodiments, the status of a particular channel as trending may impact which channels are included in the filtered search results displayed via the client device. As one example with reference to FIG. 9, the channel #platform-code-club may have been identified as having a group of members similar to the group of members present in #platform-qa (which was identified as a search result based on a comparison between the search parameter "platform" and characterizing terms associated with the #platform-qa channel), but the #platform-code-club channel may not have had a membership similarity score sufficiently high to justify inclusion in the filtered list of results to be displayed via the client device 101. However, because #platform-code-club was identified as a trending channel, #platform-code-club was promoted into the filtered listing of search results to be displayed via the client device 101.

As yet another example with reference to FIG. 7, the channels #biz-dash-metrics-arc; #cs-expansion-emea; and #business were determined to have the highest search score based on comparisons between the search parameter "ARR" and characterizing terms associated with each of the plurality of group-based communication channels. Thus, without reference to the trending status of any of these channels, these three top-ranked group-based communication channels would be reflected in the displayed search results (as indicated at FIG. 6). In certain embodiments, the trending status of any one or more of these displayed channels may be utilized to hierarchically arrange the results for display. In embodiments in which the group-based communication server 113 considers the trending nature of various channels when assembling the filtered list of search results to be displayed via a client device 101, if the channel #hiring was indicated as trending, the #hiring channel may be promoted for inclusion in the filtered search results, and the channel #business may be demoted out of the filtered search results.

With reference again to FIG. 9, the third example results interface 700 further illustrates that the results listing 702 may further comprise search results selected for inclusion because a search term ("platform" in the illustrated example of FIG. 9) matches at least one of the channel identifier and/or the topical caption 704 of a particular group-based communication channel. With specific reference to the data illustrated in FIG. 9, the channel "#devel-platform" was justified for inclusion in the results listing 702 because "The channel name matched your search term," which is evident because the term "platform" is highlighted in the topical caption 704 ("For platform technical discussion"). The results based on comparisons between the search parameter and the channel identifier and/or the topical caption 704 may be generated based on searches performed locally at the client device 101 and/or at the group-based communication server 113.

Again, like the embodiment illustrated in FIG. 8, the results listing 702 is scrollable, as evident by the partially-visible justification statement 705 for the "#platform-i18n" search result.

Based on the results listing (e.g., results listing 500, 600, or 700), a particular group-based communication channel may be selected for the client device 101 to join (e.g., by executing a target embedded within at least a portion of a search result). The client device 101 according to certain embodiments is configured to transmit a request to join the selected group-based communication channel to the group-based communication server 113. The group-based communication server 113 updates the membership of the group-based communication channel and/or updates a user profile associated with the requesting user to reflect the newly established membership with the group-based communication channel.

Once the client device 101 becomes an established member of the selected group-based communication channel, content exchanged via the group-based communication channel is transmitted to and/or available to the client device 101. Moreover, the client device 101 may additionally submit content for exchange on the group-based communication channel once the client device 101 is registered as a member of the group-based communication channel.

Additional Implementation Details

Although example processing systems have been described in reference to FIGS. 1-3, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
based at least in part on information stored in a storage device and associated with a plurality of group-based communication channels of a group-based communication system, periodically determining, at one or more defined times and by a computing device, one or more characterizing terms associated with individual group-based communication channels of the plurality of group-based communication channels, wherein the one or more characterizing terms are identified within the individual group-based communication channels equal to or greater than a threshold number of times and the one or more characterizing terms are identified within other group-based communication channels of the plurality of group-based communication channels less than the threshold number of times, wherein the one or more characterizing terms represent one or more topics of one or more topic identifiers and summarize content exchanged within messages in a specific group-based communication channel of the individual group-based communication channels;
receiving, from a client device, a search parameter associated with a search within the group-based communication system;
determining, by the computing device and in response to receiving the search parameter, a result based at least in part on a match between a threshold percentage of characters within the search parameter and the one or more characterizing terms, wherein the result includes the one or more topic identifiers and one or more group-based communication channels of the plurality of group-based communication channels;

causing display, via a user interface presented via the client device, of one or more user selectable elements presented in association with the one or more group-based communication channels, wherein selection of a user selectable element of the one or more user selectable elements causes a user associated with the client device to join a group-based communication channel associated with the user selectable element;

determining one or more members of the group-based communication system associated with the one or more topic identifiers;

determining an auxiliary result associated with the one or more members;

including, by the computing device, the group-based communication channel in the auxiliary result;

causing display of the result and the auxiliary result via the client device; and automatically updating, by the computing device, a status of the plurality of group-based communication channels after the group-based communication channel satisfies or no longer satisfies activity criteria utilized to establish the group-based communication channel.

2. The method as recited in claim 1, further comprising:
receiving, from the client device, a second selection of a second selectable element associated with the result; and based at least in part on the second selection of the second selectable element, causing display of a topic associated with the one or more topic identifiers, one or more second members associated with the topic, one or more documents of objects related to the topic, and one or more other topics related to the topic.

3. The method as recited in claim 1, wherein the auxiliary result includes information associated with the one or more members, the information including at least one of data stored in one or more accounts of the one or more members or activity of the one or more members via the group-based communication system.

4. The method as recited in claim 1, wherein:
the auxiliary result includes information associated with the one or more group-based communication channels that are different than the individual group-based communication channels;
at least one of the result or the auxiliary result is displayed via a second group-based communication channel of the plurality of group-based communication channels; and
at least a portion of the at least one of the result or the auxiliary result is displayed via the client device as the search parameter is being received by the group-based communication system.

5. The method as recited in claim 1, wherein determining the result and determining the auxiliary result comprises:
identifying a plurality of terms included within the plurality of group-based communication channels that are not reflective of content exchanged within the plurality of group-based communication channels;
associating one or more flags with the plurality of terms to generate a plurality of flagged terms; and
performing the search without considering the plurality of flagged terms.

6. The method as recited in claim 1, further comprising supplementing, via the client device, the result with the auxiliary result, wherein the auxiliary result identifies one or more additional group-based communication channels that are determined to be relevant to the search parameter.

7. The method as recited in claim 1, further comprising:
determining that a second group-based communication channel is included in the result;
determining a plurality of users that are members of the second group-based communication channel;
identifying a third group-based communication channel in which individual users of the plurality of users are members; and
including the third group-based communication channel in the auxiliary result.

8. A system comprising:
one or more processors;
a memory; and
one or more computer-executable instructions stored in the memory and executable by the one or more processor to perform operations comprising:
based at least in part on information stored in a storage device and associated with a plurality of group-based communication channels of a group-based communication system, periodically determining, at one or more defined times, one or more characterizing terms associated with individual group-based communication channels of the plurality of group-based communication channels, wherein the one or more characterizing terms are identified within the individual group-based communication channels equal to or greater than a threshold number of times and the one or more characterizing terms are identified within other group-based communication channels of the plurality of group-based communication channels less than the threshold number of times, wherein the one or more characterizing terms represent one or more topics of one or more topic identifiers and summarize content exchanged within messages in a specific group-based communication channel of the individual group-based communication channels;
receiving, from a client device, a search parameter associated with a search within the group-based communication system;
determining in response to receiving the search parameter, a result based at least in part on a match between a threshold percentage of characters within the search parameter and the one or more characterizing terms, wherein the result includes the one or more topic identifiers and one or more group-based communication channels of the plurality of group-based communication channels;
causing display, via a user interface presented via the client device, of one or more user selectable elements presented in association with the one or more group-based communication channels, wherein selection of a user selectable element of the one or more user selectable elements causes a user associated with the client device to join a group-based communication channel associated with the user selectable element;
determining one or more members of the group-based communication system associated with the one or more topic identifiers;
determining an auxiliary result associated with the one or more members;
including, by the computing device, the group-based communication channel in the auxiliary result;
causing display of the result and the auxiliary result via the client device; and automatically updating a status of the plurality of group-based communication channels after the group-based communication channel satisfies or no longer satisfies activity criteria utilized to establish the group-based communication channel.

9. The system as recited in claim 8, wherein the operations further comprise:
receiving, from the client device, a second selection of a second selectable element associated with the result; and
based at least in part on the second selection of the second selectable element, causing display of a topic associated with the one or more topic identifiers, one or more second members associated with the topic, one or more documents of objects related to the topic, and one or more other topics related to the topic.

10. The system as recited in claim 8, wherein the auxiliary result includes information associated with the one or more members, the information including at least one of data stored in one or more accounts of the one or more members or activity of the one or more members via the group-based communication system.

11. The system as recited in claim 8, wherein the auxiliary result includes information associated with the one or more group-based communication channels that are different than the individual group-based communication channels.

12. The system as recited in claim 8, wherein at least one of the result or the auxiliary result is displayed via a second group-based communication channel of the plurality of group-based communication channels.

13. The system as recited in claim 8, wherein at least a portion of at least one of the result or the auxiliary result is displayed via the client device as the search parameter is being received by the group-based communication system.

14. The system as recited in claim 8, wherein:
the result is selectable to reveal first information associated with the result; and
the auxiliary result is selectable to reveal second information associated with the auxiliary result.

15. The system as recited in claim 8, wherein the operations further comprise supplementing, via the client device, the result with the auxiliary result, wherein the auxiliary result identifies one or more additional group-based communication channels that are determined to be relevant to the search parameter.

16. One or more non-transitory computer-readable media storing one or more computer-executable instructions that, when executed by one or more processors, cause the one or more processors to perform operations comprising:
based at least in part on information stored in a storage device and associated with a plurality of group-based communication channels of a group-based communication system, periodically determining, at one or more defined times, one or more characterizing terms associated with individual group-based communication channels of the plurality of group-based communication channels, wherein the one or more characterizing terms are identified within the individual group-based communication channels equal to or greater than a threshold number of times and the one or more characterizing terms are identified within other group-based communication channels of the plurality of group-based communication channels less than the threshold number of times, wherein the one or more characterizing terms represent one or more topics of one or more topic identifiers and summarize content exchanged within messages in a specific group-based communication channel of the individual group-based communication channels;
receiving, from a client device, a search parameter associated with a search within the group-based communication system;
determining in response to receiving the search parameter, a result based at least in part on a match between a threshold percentage of characters within the search parameter and the one or more characterizing terms, wherein the result includes the one or more topic identifiers and one or more group-based communication channels of the plurality of group-based communication channels;
causing display, via a user interface presented via the client device, of one or more user selectable elements presented in association with the one or more group-based communication channels, wherein selection of a user selectable element of the one or more user selectable elements causes a user associated with the client device to join a group-based communication channel associated with the user selectable element; with the one or more topic identifiers;
determining one or more members of the group-based communication system associated with the one or more topic identifiers;
determining an auxiliary result associated with the one or more members;
including the group-based communication channel in the auxiliary result;
causing display of the result and the auxiliary result via the client device; and
automatically updating a status of the plurality of group-based communication channels after the group-based communication channel satisfies or no longer satisfies activity criteria utilized to establish the group-based communication channel.

17. The one or more non-transitory computer-readable media as recited in claim 16, wherein the operations further comprise:
receiving, from the client device, a second selection of a second selectable element associated with the result; and
based at least in part on the second selection of the second selectable element, causing display of a topic associated with the one or more topic identifiers, one or more second members associated with the topic, one or more documents of objects related to the topic, and one or more other topics related to the topic.

18. The one or more non-transitory computer-readable media as recited in claim 16, wherein the auxiliary result includes information associated with the one or more members, the information including at least one of data stored in one or more accounts of the one or more members or activity of the one or more members via the group-based communication system.

19. The one or more non-transitory computer-readable media as recited in claim 16, wherein the auxiliary result includes information associated with the one or more group-based communication channels that are different than the individual group-based communication channels.

20. The one or more non-transitory computer-readable media as recited in claim 16, wherein the operations further comprise supplementing, via the client device, the result with the auxiliary result, wherein the auxiliary result identifies one or more additional group-based communication channels that are determined to be relevant to the search parameter.

\* \* \* \* \*